US008112365B2

(12) United States Patent
Foster

(10) Patent No.: US 8,112,365 B2
(45) Date of Patent: Feb. 7, 2012

(54) SYSTEM AND METHOD FOR ONLINE EMPLOYMENT RECRUITING AND EVALUATION

(76) Inventor: Scott C. Foster, Wilmington, DE (US)

( * ) Notice: Subject to any disclaimer, the term of this patent is extended or adjusted under 35 U.S.C. 154(b) by 50 days.

(21) Appl. No.: 12/339,299

(22) Filed: Dec. 19, 2008

(65) Prior Publication Data
US 2010/0161503 A1 Jun. 24, 2010

(51) Int. Cl.
G06Q 10/00 (2006.01)
(52) U.S. Cl. ........................................................ 705/321
(58) Field of Classification Search .................... 705/321
See application file for complete search history.

(56) References Cited

U.S. PATENT DOCUMENTS

| | | | |
|---|---|---|---|
| 5,884,270 A | 3/1999 | Walker et al. | |
| 5,978,768 A | 11/1999 | McGovern et al. | |
| 6,370,510 B1 | 4/2002 | McGovern et al. | |
| 6,385,620 B1 * | 5/2002 | Kurzius et al. | 1/1 |
| 6,618,734 B1 | 9/2003 | Williams et al. | |
| 7,295,991 B1 | 11/2007 | Clarke et al. | |
| 7,302,467 B2 | 11/2007 | Matsuda et al. | |
| 7,315,891 B2 | 1/2008 | Donahue | |
| 7,319,951 B2 | 1/2008 | Rising, III et al. | |
| 7,337,208 B2 | 2/2008 | Gall et al. | |
| 7,345,025 B2 | 3/2008 | Symonds et al. | |
| 7,348,407 B2 | 3/2008 | La Thangue et al. | |
| 7,358,222 B2 | 4/2008 | Nadel et al. | |
| 7,362,724 B2 | 4/2008 | Huang et al. | |
| 7,371,370 B2 | 5/2008 | Sarkar et al. | |
| 7,384,641 B2 | 6/2008 | Garzino-Demo et al. | |
| 7,390,485 B2 | 6/2008 | Jeong et al. | |
| 7,396,529 B2 | 7/2008 | Dennis et al. | |
| 2001/0049674 A1 | 12/2001 | Talib et al. | |
| 2002/0046074 A1 | 4/2002 | Barton | |
| 2002/0120532 A1 | 8/2002 | McGovern et al. | |
| 2002/0169631 A1 | 11/2002 | Lewis | |
| 2003/0050811 A1 * | 3/2003 | Freeman et al. | 705/7 |
| 2003/0120531 A1 * | 6/2003 | Parker | 705/8 |
| 2003/0182171 A1 | 9/2003 | Vianello | |
| 2005/0060318 A1 | 3/2005 | Brickman, Jr. | |
| 2006/0116894 A1 | 6/2006 | DiMarco | |
| 2007/0185723 A1 | 8/2007 | Shellnutt | |
| 2008/0082384 A1 | 4/2008 | Bekerian et al. | |
| 2008/0086504 A1 | 4/2008 | Sanders et al. | |
| 2008/0162569 A1 | 7/2008 | Schifone | |
| 2008/0183488 A1 | 7/2008 | Vianello | |
| 2008/0183585 A1 | 7/2008 | Vianello | |
| 2008/0208907 A1 * | 8/2008 | Tolve et al. | 707/104.1 |

OTHER PUBLICATIONS

Written Opinion of the International Searching Authority mailed Feb. 17, 2010, issued in connection with International Patent Appln. No. PCT/US09/67971 (8 pages).
International Search Report of the International Searching Authority mailed Feb. 17, 2010, issued in connection with International Patent Appln. No. PCT/US09/67971 (4 pages).

(Continued)

Primary Examiner — Jonathan Ouellette
(74) Attorney, Agent, or Firm — McCarter & English, LLP

(57) ABSTRACT

A system and method for online employment recruiting and evaluation is provided. An online, web-based environment allows employers to create job descriptions for posting on an Internet-based job search service in communication with the web-based environment, and allows for online recruitment and review of hiring candidates using a multi-phase approach. Each employer/supervisor specified by the candidate is interviewed, and the interview is recorded and is stored as part of the candidate's virtual dossier.

63 Claims, 36 Drawing Sheets

OTHER PUBLICATIONS

Dodge, "New Job Reference Immunity Law," printout from http://www.wileyrein.com/publication_newsletters.cfm?sp=newsletter&year=2005&ID=13&publication_id=12223&keyword (Jul. 2005) (3 pages).

Risk Management, "Lower Employee Morale and Decreased Productivity are the Biggest Consequences of Bad Hiring and Promotion Decisions." (2004) (2 pages).

Milford, "No Bozos! Businesses Can't Afford to Hire Erratic Employees—That's Why It's Vital to Master the Art of Evaluating People," printout from http://www.delawareonline.com/apps/pbcs.dll/article?AID=/20080811/BUSINESS/808110310/1003&referrer=NEWSFRONTCAROUSEL (Aug. 11, 2008) (3 pages).

* cited by examiner

FIG. 8A

| | | PRIORITY | WEIGHT |
|---|---|---|---|
| JOB DESCRIPTION REQUIRED ATTRIBUTES | | | |
| ▲ □ 1 ATTRIBUTE 1 | | 1 | |
| ▲ □ 2 ATTRIBUTE 2 | | 3 | |
| ▲ □ 3 ATTRIBUTE 3 | | 2 | |
| ▲ □ 4 ATTRIBUTE 4 | | 5 | |
| ▲ □ 5 ATTRIBUTE 5 | | 4 | |
| ▼ □ 6 JOB DESCRIPTION | | 4 | |
| ▼ □ COMPANY | | | |
| • □ 1 TODAYS OFFICE PROFESSIONALS | | | |
| ▼ □ LOCATION | | | |
| • □ 1 FENTON, MO 63099 | | | |
| ▼ □ SALARY/WAGE | | | |
| • □ USD 31,000.00/YEAR | | | |
| ▼ □ STATUS | | | |
| • □ FULL TIME, EMPLOYEE, INTERN | | | |
| ▼ □ JOB CATEGORY | | | |
| • □ HUMAN RESOURCES | | | |
| ▼ □ CAREER LEVEL | | | |
| • □ EXPERIENCED (NON-MANAGER) | | | |
| ▼ □ INDUSTRY | | | |
| • □ STAFFING/EMPLOYMENT AGENCIES | | | |
| ▼ □ EDUCATION LEVEL | | | |
| • □ BACHELORS DEGREE | | | |
| ▼ □ OCCUPATIONS | | | |
| • □ RECRUITING /SOURCING | | | |
| ▼ □ CONTACT | | | |
| • □ KIM OR MEGAN | | | |
| ▼ □ ADDRESS | | | |

ATTRIBUTE DESCRIPTION
- 1 ATTRIBUTE 1
- 2 ATTRIBUTE 2
- 3 ATTRIBUTE 3
- 4 ATTRIBUTE 4
- 5 ATTRIBUTE 5
- 6 JOB...

FIG. 8B

| monster | MY MONSTER | FIND JOBS | POST RESUME | MONEY | EDUCATION | CAREER ADVICE | JOB FAIRS »

✉ SEND THIS JOB TO A FRIEND   🔍 SEE ALL TODAYS OFFICE PROFESSIONALS OPPORTUNITIES todaysoffice professionals

JOB INFORMATION

- COMPANY: TODAYS OFFICE PROFESSIONALS
- LOCATION: FENTON, MO 63099
- SALARY/WAGE: USD 31,000.00 /YEAR
- STATUS: FULL TIME, EMPLOYEE, INTERN
- JOB CATEGORY: HUMAN RESOURCES
- CAREER LEVEL: EXPERIENCED (NON-MANAGER)
- INDUSTRY: STAFFING/EMPLOYMENT AGENCIES
- EDUCATION LEVEL: BACHELOR'S DEGREE
- OCCUPATIONS: RECRUITING/SOURCING
- INDUSTRY: STAFFING/EMPLOYMENT AGENCIES
- CONTACT: KIM OR MEGAN
- ADDRESS: 7711 BONHOMME SUITE 700 CLAYTON, MISSOURI 63105
- PHONE: 314-721-3954
- EMAIL: APPLY BY EMAIL
- REFERENCE CODE: 1001153462

RECRUITING ASSISTANT

JOB PURPOSE:
MAINTAINS FLOW OF JOB APPLICANTS BY PLACING JOB OPENINGS; ASSEMBLING RECRUITING MATERIALS; SCREENING AND REFERRING APPLICANTS; CHECKING REFERENCES; PREPARING REPORTS; PROVIDING ADMINISTRATIVE AND SECRETARIAL SUPPORT TO CORPORATE RECRUITER.
DUTIES:
* PREPARES WORK TO BE ACCOMPLISHED BY GATHERING AND ORGANIZING INFORMATION AND REQUIREMENTS, INCLUDING JOB REQUISITIONS; SETTING PRIORITIES.
* PLACES JOB OPENINGS BY SUBMITTING PRINT ADVERTISEMENTS, JOB BOARD POSTINGS, JOB FAIR AND COLLEGE RECRUITING REGISTRATIONS, AND ORGANIZATION WEB PAGE ANNOUNCEMENTS.
* SUPPORTS RECRUITING EFFORTS BY: SETTING-UP INTERVIEW SCHEDULES; PRESCREENING RESUMES, ARRANGING APPLICANT VISITS & APPOINTMENTS,
* ESTABLISHES CANDIDATE QUALIFICATIONS BY SCREENING APPLICANTS; ADMINISTERING TESTS; COMPLETING REFERENCE CHECKS AND BACKGROUND CHECKS.
* REFERS CANDIDATES BY FORWARDING INFORMATION TO CORPORATE RECRUITER.
* MAINTAINS APPLICANT TRACKING SYSTEM BY ENTERING AND UPDATING REQUISITION, SOURCING, PROFILING, RESUME MANAGEMENT, MATCHING, TRACKING, AND HIRING INFORMATION.
* PREPARES RECRUITING REPORTS BY COLLECTING, ANALYZING, AND SUMMARIZING DATA AND TRENDS.
* PRODUCES ADMINISTRATIVE INFORMATION BY PREPARING LETTERS; TRANSCRIBING, FORMATTING, INPUTTING, EDITING, RETRIEVING, COPYING, AND TRANSMITTING TEXT, DATA, AND GRAPHICS.
* ENHANCES DEPARTMENT AND ORGANIZATION REPUTATION BY ACCEPTING OWNERSHIP FOR ACCOMPLISHING NEW AND DIFFERENT REQUESTS; EXPLORING OPPORTUNITIES TO ADD VALUE TO JOB ACCOMPLISHMENTS.
SKILLS/QUALIFICATIONS: MICROSOFT WORD, EXCEL AND OUTLOOK.
RECRUITING, MAINTAINING EMPLOYEE FILES, OFFICE EXPERIENCE - GENERAL, DOCUMENTATION SKILLS, REPORTING SKILLS, SCHEDULING, VERBAL COMMUNICATION, ATTENTION TO DETAIL, THOROUGHNESS, PEOPLE SKILLS, JUDGMENT.
POSITION WILL PAY 13.00-14.00 INITIALLY AND THEN ONCE HIRED ON 32K+ PER YEAR PLUS BENEFITS. EXCELLENT OPPORTUNITY TO GET YOUR FOOT IN THE DOOR IN AN HUMAN RESOURCES ENVIRONMENT. INTERESTED CANDIDATES SHOULD EMAIL THEIR RESUME AS A MICROSOFT WORD ATTACHMENT TO : CONSULTANT0057@TODAYS.COM AND ENTER FENTON HUMAN RESOURCES IN THE SUBJECT LINE OF YOUR EMAIL.

FIG. 9A

| careerbuilder | BACK TO SEARCH RESULTS >> | todaysoffice professionals

| SEE ALL JOBS AT THIS COMPANY | EMAIL THIS JOB | SAVE THIS JOB | PRINTER-FRIENDLY VERSION |

JOB INFORMATION

- COMPANY:
  TODAYS OFFICE PROFESSIONALS
- LOCATION:

US-MO-CLAYTON

- SALARY/WAGE:
  $32,000 /YEAR
- STATUS:
  FULL-TIME EMPLOYEE
- SHIFT:
- RELEVANT WORK EXPERIENCE:
  NOT SPECIFIED
- CAREER LEVEL:
  FULL-TIME EMPLOYEE
- EDUCATION LEVEL:
  4 YEAR DEGREE
- OCCUPATIONS:
- INDUSTRY:
  OTHER GREAT INDUSTRIES
  EMPLOYMENT - RECRUITING -
  STAFFING OTHER GREAT
  INDUSTRIES
  EMPLOYMENT - RECRUITING -
  STAFFING
- PHONE:
  314-721-3954
- EMAIL:
  SEND EMAIL NOW
- REFERENCE CODE:
  RECRUITING ASSISTANT IN FENTON

HUMAN RESOURCES ASSISTANT - COORDINATOR

[ APPLY NOW ]

JOB DESCRIPTION

RECRUITING ASSISTANT- POSITION LOCATED IN FENTON MISSOURI. LOOKING FOR AN INDIVIDUAL WHO WOULD HAVE INTEREST IN GETTING THEIR FOOT IN THE DOOR AND WORKING IN AN HUMAN RESOURCES ENVIRONMENT LONG TERM. POSITION WOULD REQUIRE SOMEONE WITH A DESIRE TO WORK IN AN HR SETTING AND LONG TERM MOVE INTO AN HR STAFFING CAREER.

RECRUITING ASSISTANT POSITION -
THIS POSITION REPORTS TO THE CORPORATE RECRUITER. THE SUCCESSFUL CANDIDATE WILL NEED TO BE FLEXIBLE, ORGANIZED, DETAIL ORIENTED AND CREATIVE IN ORDER TO BE SUCCESSFUL. WE EXPECT THE RECRUITING COORDINATOR TO BE ACCOUNTABLE FOR THEIR WORK WHILE MAINTAINING A HIGH LEVEL OF CONFIDENTIALITY.

RESPONSIBILITIES:
MAINTAIN THE INTEGRITY OF OUR APPLICANT TRACKING SYSTEM
POST OPEN POSITIONS ONTO COMPANY JOB BOARD, MONSTER.COM AND OTHER JOB BOARDS AS REQUESTED
PRE-SCREEN RESUMES TO DETERMINE FIT WITH MINIMUM QUALIFICATIONS
ARRANGE FORMAL INTERVIEWS AND TELEPHONE SCREENS VIA OUTLOOK
COORDINATE TRAVEL ARRANGEMENTS FOR OUT-OF-TOWN CANDIDATES, WITH SOME SUPPORT FROM THE HR
COORDINATOR
COORDINATE CANDIDATE TESTING/SCREENING WITH OUR 3RD PARTY VENDOR
COMPLETE REFERENCE CHECKS UNDER THE DIRECTION OF THE CORPORATE RECRUITER
PROCESS BACKGROUND CHECKS AND NEW HIRE PAPERWORK
RESEARCH POTENTIAL RESOURCES INCLUDING CREATIVE SOURCING OUTLETS, NEW JOB BOARDS, USER GROUPS OR
NETWORKS, ADVERTISING OPPORTUNITIES, ETC.
CREATE AND MAINTAIN ON-GOING REPORTS IN EXCEL OR SIMILAR
ASSIST IN THE CREATION OF POWERPOINT PRESENTATIONS
ASSIS CORPORATE RECRUITER IN PROJECTS AND/OR ON-GOING ACTIVITIES
OTHER DUTIES AS ASSIGNED
MINIMUM QUALIFICATIONS/REQUIREMENTS:
BACHELOR'S DEGREE PREFERRED
1+ YEAR (S) OF PROFESSIONAL LEVEL EXPERIENCE, AT LEAST SOME EXPERIENCE INTERACTING WITH
CLIENTS/CUSTOMERS IN PERSON AND OVER THE TELEPHONE
PROFICIENCY IN MS OFFICE SUITE
STRONG PRIMARY, SECONDARY AND INTERNET RESEARCH SKILLS
PREFERENCE TOWARD CANDIDATES FAMILIAR WITH 2.0/SOCIAL MEDIA (LINKEDIN, MYSPACE, FACEBOOK, ETC)
ABILITY TO WORK AUTONOMOUSLY IN A FAST PACED ENVIRONMENT
INTERESTED CANDIDATES SHOULD FORWARD THEIR RESUME TO:CONSULTANT0057@TODAYS.COM AND ENTER FENTON RECRUITING ASSISTANT IN THE SUBJECT LINE OF YOUR EMAIL.

FIG. 10A

| ABOUT TODAYS | POSITION WILL PAY 13.00-14.00 AN HOUR INITIALLY AND THEN ONCE HIRED ON SALARY 32K+ PER YEAR ONCE HIRED ON PLUS BENEFITS. EXCELLENT OPPORTUNITY FOR INDIVIDUAL LOOKING TO GET THEIR FOOT IN THE DOOR IN THE HR OR RECRUITING FIELD. INTERESTED CANDIDATES SHOULD EMAIL THEIR RESUME SAVED AS A MICROSOFT WORD ATTACHMENT TO:CONSULTANT0057@TODAYS.COM AND ENTER RECRUITING ASSISTANT IN THE SUBJECT LINE OF YOUR EMAIL. |
|---|---|
| AT TODAYS OFFICE PROFESSIONALS, WE PLACE A FULL SPECTRUM OF FLEXIBLE, TEMP-TO-HIRE AND DIRECT-HIRE TALENT. THOUSANDS OF INDIVIDUAL TRUST US AS THEIR JOB SEARCH PARTNER. WE'LL HELP YOU ADVANCE YOUR CAREER THROUGH REWARDING JOB OPPORTUNITIES. | JOB REQUIREMENTS<br>MINIMUM QUALIFICATIONS/REQUIREMENTS:<br>-BACHELOR'S DEGREE PREFERRED<br>-1+ YEAR (S) OF PROFESSIONAL LEVEL EXPERIENCE, AT LEAST SOME EXPERIENCE INTERACTING WITH CLIENTS/CUSTOMERS IN PERSON AND OVER THE TELEPHONE<br>-PROFICIENCY IN MS OFFICE SUITE<br>-STRONG PRIMARY, SECONDARY AND INTERNET RESEARCH SKILLS<br>-PREFERENCE TOWARD CANDIDATES FAMILIAR WITH WEB 2.0/SOCIAL MEDIA (LINKEDIN, MYSPACE, FACEOOK, ETC)<br>-ABILITY TO WORK AUTONOMOUSLY IN A FAST PACED ENVIRONMENT<br>-EXCELLENT COMMUNICATION SKILLS BOTH WRITTEN AND VERBAL.<br>-ABILITY TO MULTI-TASK AND WORK IN A FACED PACED ENVIRONMENT. |

[APPLY NOW]

CAREERBUILDER.COM'S ADVICE

FOR YOUR PRIVACY AND PROTECTION, WHEN APPLYING TO A JOB ONLINE: NEVER GIVE YOUR SOCIAL SECURITY NUMBER TO A PROSPECTIVE EMPLOYER, PROVIDE CREDIT CARD OR BANK ACCOUNT INFORMATION, OR PERFORM ANY SORT OF MONETARY TRANSACTION.   LEARN MORE >>

BY APPLYING TO A JOB USING CAREERBUILDER.COM YOU ARE AGREEING TO COMPLY WITH AND BE SUBJECT TO THE CAREERBUILDER.COM TERMS AND CONDITIONS FOR USE OF OUR WEBSITE. TO USE OUR WEBSITE, YOU MUST AGREE WITH THE TERMS AND CONDITIONS AND BOTH MEET AND COMPLY WITH THEIR PROVISIONS.

FIG. 10B

| EXIT | | ABOUT | HELP |
|---|---|---|---|
| SETUP SURVEY | CONDUCT SURVEY | VIEW RESULTS | ANALYZE RESULTS |

- MY RESPONDENTS
  - RESPONDENT MASTER LIST
  - SAMPLE RESPONDENT LIST
- MY SURVEYS
  - IT SENIOR RECRUITER
    - SKILLS ASSESSMENT
  - NDA
  - NDA
  - SALES & STAFFING ASSISTANT
  - QUALIFICATIONS
  - SAMPLE EXAM
  - SAMPLE SURVEY
- SURVEY TEMPLATES

| # | QUESTIONS | REQUIRED |
|---|---|---|
| 1. | THE SUCCESSFUL RECRUITER IN OUR FIRM WILL TYPICALLY PLACE AN AVERAGE OF 4 PEOPLE IN CONTRACT POSITIONS PER MONTH (DOES NOT INCLUDE FULL-TIME HIRES OR TEMP TO PERM.). PLEASE INDICATE WHICH MOST CLOSELY REPRESENTS YOUR PAST PERFORMANCE. NOTE: WE WILL BE CHECKING WITH YOUR PAST SUPERVISORS TO VERIFY YOUR ANSWERS. | YES |
| 2. | MAINTAINING ADEQUATE MARGINS IS VERY IMPORTANT. WE LOOK TO MAINTAIN A MARGIN OF 30% OR BETTER FOR CONTRACTORS. | YES |
| 3. | WE ARE LOOKING FOR RECRUITERS THAT CAN SOURCE CANDIDATES WITHOUT HAVING TO RELY SOLELY ON JOB BOARDS AND THIRD PARTIES. HOW DO YOU SOURCE CANDIDATES? | YES |
| 4. | WE ARE LOOKING FOR RECRUITERS THAT HAVE TECHNICAL LITERACY. PLEASE RATE YOUR TECHNICAL KNOWLEDGE. | YES |
| 5. | WHILE WE HAVE STAFF TO ASSIST WITH RECRUITING BACK OFFICE PROCESSES, WE ARE LOOKING FOR SELF-SUFFICIENT RECRUITERS. THE SUCCESSFUL CANDIDATE SHOULD BE ABLE TO COLLECT AND COMPILE APPLICANT RESPONSES, INTO A SUITABLE FORMAT FOR PRESENTATION TO THE CLIENT. | YES |

| NEW SURVEY | NEW SECTION | NEW QUESTION | NEW GROUP | NEW RESPONDENT | NEW FOLDER |

IT SENIOR RECRUITER

PLEASE COMPLETE THIS SHORT QUESTIONNAIRE, WHICH INCLUDES A SHORT SKILLS ASSESSMENT FOR THE JOB IN QUESTION. ONCE WE HAVE COLLECTED THE RESPONSE, WE WILL CONTACT YOU FOR FURTHER INFORMATION.

PLEASE NOTE THAT WE DO VERY DETAILED REFERENCE CHECKS. YOU WILL BE ASKED TO PROVIDE YOUR LAST 5 SUPERVISORS IN CHRONOLOGICAL ORDER (YOU MAY HAVE MORE THAN ONE SUPERVISOR IN ANY GIVEN JOB). KEEP THIS IN MIND AS YOU DO THE SELF-ASSESSMENT.

**PLEASE PROVIDE THE FOLLOWING (*REQUIRED)**

FIRST NAME *  [          ]
LAST NAME *   [          ]
ADDRESS*      [          ]
CITY*         [          ]
STATE / PROVINCE* [      ]
POSTAL CODE*  [          ]
PHONE*        [          ]
EMAIL *       [          ]

SKILLS ASSESSMENT

1. THE SUCCESSFUL RECRUITER IN OUR FIRM WILL TYPICALLY PLACE AN AVERAGE OF 4 PEOPLE IN CONTRACT POSITIONS PER MONTH (DOES NOT INCLUDE FULL-TIME HIRES OR TEMP TO PERM). PLEASE INDICATE WHICH MOST CLOSELY REPRESENTS YOUR PAST PERFORMANCE. NOTE: WE WILL BE CHECKING WITH YOUR PAST SUPERVISORS TO VERIFY YOUR ANSWERS.

○ WITHIN 60 DAYS OF STARTING THE POSITION, I MADE FOUR PLACEMENTS PER MONTH EVERY MONTH.
   ○ I MADE AN AVERAGE OF 3 PLACEMENTS PER MONTH.
   ○ I MADE AN AVERAGE OF 2 PLACEMENTS PER MONTH.
   ○ I MADE AN AVERAGE OF 1 PLACEMENT PER MONTH.
   ○ I MADE AN LESS THAN PLACEMENT PER MONTH.

FIG. 23B

2. MAINTAINING ADEQUATE MARGINS IS VERY IMPORTANT. WE LOOK TO MAINTAIN A MARGIN OF 30% OR BETTER FOR CONTRACTORS.

○ EVERY PLACEMENT I HAVE MADE WAS ABOVE A 30% MARGIN

○ THE AVERAGE MARGIN FOR ALL MY PLACEMENTS HAS BEEN ABOVE 30%

○ THE AVERAGE MARGIN FOR ALL MY PLACEMENTS HAS BEEN BETWEEN 25% AND 30%

○ THE AVERAGE MARGIN FOR ALL MY PLACEMENTS HAS BEEN BETWEEN 20% AND 25%

○ THE AVERAGE MARGIN FOR ALL MY PLACEMENTS HAS BEEN BELOW 20%

3. WE ARE LOOKING FOR RECRUITERS THAT CAN SOURCE CANDIDATES WITHOUT HAVING TO RELY SOLELY ON JOB BOARDS AND THIRD PARTIES. HOW DO YOU SOURCE CANDIDATES?

○ I HAVE A FULLY DEVELOPED CANDIDATE NETWORK. OVER 75% OF MY SUBMITTALS ARE SOURCED OUTSIDE OF JOB BOARDS AND THIRD PARTIES.

○ I HAVE A GOOD CANDIDATE NETWORK. OVER 50% OF MY SUBMITTALS ARE SOURCED OUTSIDE OF JOB BOARDS AND THIRD PARTIES.

○ I HAVE A LIMITED CANDIDATE NETWORK. I OFTEN RELY ON THE COMPANY CANDIDATE DATABASE AND I TYPICALLY USE THE JOB BOARDS OR THIRD PARTIES.

○ I DON'T HAVE A CANDIDATE NETWORK. I RELY HEAVILY ON JOB BOARDS AND THIRD PARTIES.

○ I DON'T HAVE A CANDIDATE NETWORK. I AM TOTALLY RELIANT ON JOB BOARDS AND THIRD PARTIES.

4. WE ARE LOOKING FOR RECRUITERS THAT HAVE TECHNICAL LITERACY. PLEASE RATE YOUR TECHNICAL KNOWLEDGE.

○ I AM A HIGHLY TECHNICAL, EXPERIENCED IT PROFESSIONAL, WITH AT LEAST 5 YEARS IN THE IT BUSINESS. I HAVE A TECHNICAL DEGREE OR TECHNICAL CERTIFICATIONS. I CAN COMFORTABLY DISCUSS ALL TECHNICAL TOPICS WITH CANDIDATES, INCLUDING NETWORKING, OBJECT ORIENTED PROGRAMMING, CRM & ERP.

○ I HAVE A GOOD TECHNICAL BACKGROUND. I AM COMFORTABLE WITH SPECIFIC AREAS OF IT. I MAY NOT HAVE A TECHNICAL

FIG. 26

FIG. 27

SYSTEM AND METHOD FOR ONLINE EMPLOYMENT RECRUITING AND EVALUATION

BACKGROUND OF THE INVENTION

1. Field of the Invention

The present invention relates to a system and method for online employment recruiting and evaluation.

2. Related Art

Internet-accessible job posting websites have existed for a number of years. These systems allow a potential employee to create an online profile, to upload a resume, to search through job postings electronically posted at the website, and to respond to desired job postings by electronically submitting the individual's credentials and resume to the companies posting the job listings. Examples of such systems include the CARRERBUILDER.COM and MONSTER.COM websites.

A particular drawback of existing job posting websites is that they do not adequately screen candidates prior to submitting credentials of the candidates to the posting companies. As a result, less-than-desirable candidates may be able to respond to job postings, which results in a waste of the posting company's time and resources. Additionally, existing posting websites do not adequately facilitate investigation of the candidate's previous employment history, prior to submitting the candidate's credentials to a posting company for review. The prospect of investigating (i.e., interviewing) a candidate's previous employers/supervisors provides a powerful screening tool, in that individuals with poor employment histories are less likely to respond to a job posting if they are faced with the prospect that previous employers/supervisors will be investigated as a result of a job hiring process. Thus, the failure of existing job posting websites to take advantage of such background investigations can result in individuals who have poor employment histories being able to submit their credentials to posting companies. Again, this results in a waste of the posting company's time and resources.

Another drawback of existing job posting websites is that many allow for direct communication between candidates and the posting companies using the website. Thus, the website merely acts as a searching tool for locating desired companies, and a "conduit" for communication between candidates and posting companies. As such, posting companies may be required to engage in direct communication with less-than-desirable candidates.

SUMMARY OF THE INVENTION

The present invention relates to a system and method for online employment recruiting and evaluation. An online, web-based environment (accessible using an Internet web browser or a "fat" software client application executing locally on a user's personal computer and in communication with the web-based environment) allows employers to create job descriptions for posting on an Internet-based job search service in communication with the web-based environment, or for posting in conventional, print-based media such as newspapers, periodicals, etc. The present invention allows for online recruitment and review of hiring candidates using a multi-phase approach.

In a first phase of the present invention, an employer can also create an initial questionnaire associated with the job descriptions, which must be answered by potential employees as part of the recruitment and hiring process. When a desired job posting has been identified by a potential employee, the potential employee is directed to the web-based environment of the present invention, and is asked to provide information in response to the job description and to answer the initial questionnaire. In response to the initial questionnaire, the potential employee is asked to consent to interviews of the potential employee's previous employers/supervisors, and to provide contact information for the previous employers/supervisors. A virtual dossier is created for each potential employee, is stored in a database, and can be reviewed by the employer.

In a second phase of the present invention, the employer reviews the virtual dossiers, and selects desired candidates based upon information provided in response to the initial questionnaire. The selected candidates are then notified of their selection, and are provided with a second questionnaire using the web-based environment of the present invention, which asks the selected candidates to provide additional information including, but not limited to, information about previous employers/supervisors as well as the candidate's estimate of how each previous employer/supervisor would rank the candidate's past job performance. Additionally, the candidate can conduct his or her own review of the previous employer/supervisor. Final confirmation to interview each previous employer/supervisor is obtained from each candidate, and the virtual dossier of each candidate is updated to reflect responses to the second questionnaire.

In a third phase of the present invention, the employer reviews the updated virtual dossiers of the candidates and, based upon responses to the second questionnaire, selects a subset of candidates for a telephone interview. Each candidate is notified of the selection, and is required to consent to recording of the telephone interview. The telephone interview is conducted and recorded, and the recorded interview is stored as part of the virtual dossier. Optional voice stress analysis software could be applied to the recorded interview to determine whether the candidate may not be providing truthful answers to the interviewer's questions. The virtual dossier is updated with the recorded interview as well as with the interviewer's notes. Optionally, the interview could be scored or weighted to provide an indication of the candidate's performance.

In a fourth phase of the present invention, the updated virtual dossiers are reviewed by the employer, and for each candidate, the employer selects previous employers/supervisors to be interviewed. Each employer/supervisor is notified of the interview, is requested to consent to recording of the interview, and is provided with the candidate's questionnaire responses relating to the employer/supervisor. The interview is conducted (e.g., telephonically) and recorded, and the recorded interview is stored as part of the candidate's virtual dossier. Optional voice stress analysis software could be applied to the recorded interview to determine whether the candidate may not be providing truthful answers to the interviewer's questions. The virtual dossier is updated with the recorded interview as well as with the interviewer's notes.

In a fifth phase, the employer reviews the candidates' updated virtual dossiers, and selects a final group of candidates for an in-person interview. The in-person interview is conducted and recorded (e.g., video recording), and is made part of the candidate's virtual dossier. Optional voice stress analysis software could be applied to the recorded interview to determine whether the candidate may not be providing truthful answers to the interviewer's questions. The virtual dossier is updated with the recorded interview and the interviewer's notes, and a final review of the updated virtual dossiers is conducted by the employer so that the employer can select a final candidate for hiring. The virtual dossier can be made part of the hired candidate's personnel file, and provides a digital, comprehensive, and easy-to-access record of the recruitment and evaluation process of the candidate.

BRIEF DESCRIPTION OF THE DRAWINGS

The foregoing features of the invention will be apparent from the following Detailed Description of the Invention, taken in connection with the accompanying drawings, in which:

FIGS. 8A-8B are screenshots showing a user interface screen generated by the present invention for allowing an employer to create a job description;

FIGS. 9A-10B are screenshots showing completed job descriptions as posted on job search websites;

FIGS. 11-22 are screenshots generated by the present invention for allowing an employer to create and manage questionnaires (surveys) associated with a job description, to be answered by candidates;

FIGS. 23A-23B are screenshots showing a sample questionnaire (survey) generated by the present invention, in connection with a job description;

FIGS. 24-28 are screenshots showing user interface screens generated by present invention for allowing an employer to conduct surveys, and to collect, view, and analyze survey results;

DETAILED DESCRIPTION OF THE INVENTION

The present invention relates to a system and method for online employment recruiting and evaluation, as described in detail below in connection with FIGS. 1-32.

Figure 1:
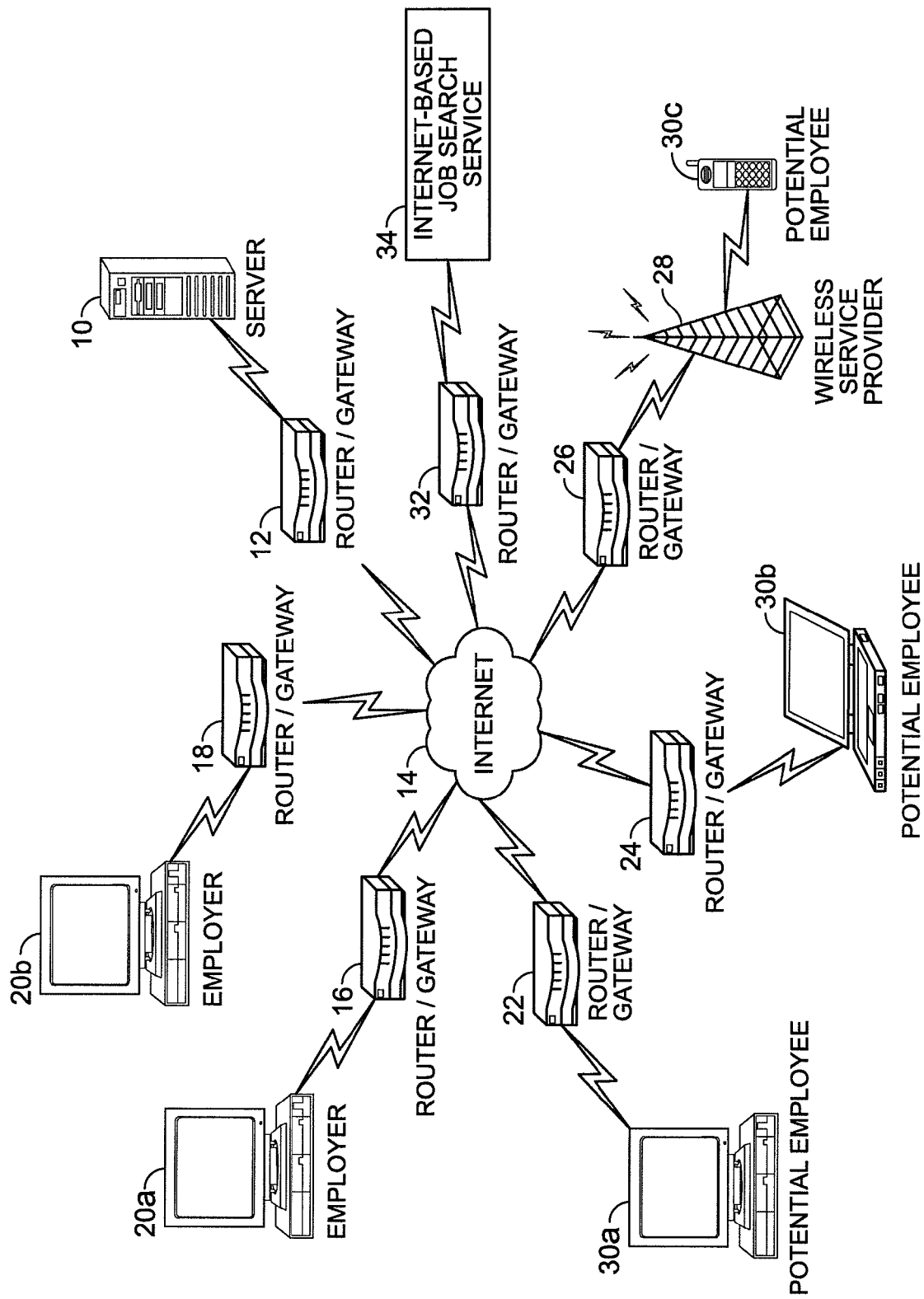
FIG. 1 is a diagram showing hardware components of the present invention.

FIG. 1 is a diagram showing hardware components of the present invention. A server 10 executes processing steps in accordance with the present invention, discussed below, for recruiting individuals in an on-line, web-based environment. The server 10 could include one or more servers to provide "N-Tier" scalability (N being any integer), including application server(s), web server(s), and database server(s) each having, for example, 4 gigabytes of random access memory (RAM) and running various operating systems, such as Windows Server, MacOS or variants of Unix/Linux. The server 10 could also include one or more networked computer systems, a distributed computing system, or any other suitable hardware components. The server 10 provides one or more employers 20a-20b, each having a computer system in communication with the server 10 via the Internet 14, with a web-based environment for allowing the employers 20a-20b to recruit potential employees (candidates) for employment. The computer systems of the employers 20a-20b and the server 10 communicate with the Internet 14 using routers/gateways 12, 16, and 18, as is known in the art. Such devices could also include firewall capabilities to prevent unauthorized access.

One or more potential employees 30a-30c, each using a computer system (e.g., personal computer, laptop, etc.), are also in communication with the server 10 via the Internet 14 and associated routers/gateways 22-26. The potential employees 30a-30c can respond to job postings posted by the employers 20a-20c, and participate in an interview process using the server 10. As shown, the potential employee 30c can communicate with the server 10 using a cellular telephone having a data connection with a wireless service provider 28. The employees 30a-30c are provided with a web-based environment for participating in an interview and selection process defined by the employers 20a-20b. As discussed below, this environment allows the potential employees 30a-30c to respond to a job posting request, to provide curriculum vitae, to answer customized questionnaires generated by the employers 20a-20b, and to participate in an interview process. The server 10 could optionally be in communication with an Internet-based job search service 34 (via a respective router/gateway 32), such as MONSTER.COM®, CARREERBUILDER.COM®, or other service, to allow job postings created by the employers 20a-20b to be posted on such sites for subsequent searching by the potential employees 30a-30c. It is noted that the number of employers 20a-20b and potential employees 30a-30c is not limited to those shown in FIG. 1, and that the server 10 could be in communication with numerous employers and potential employees.

Figure 2:
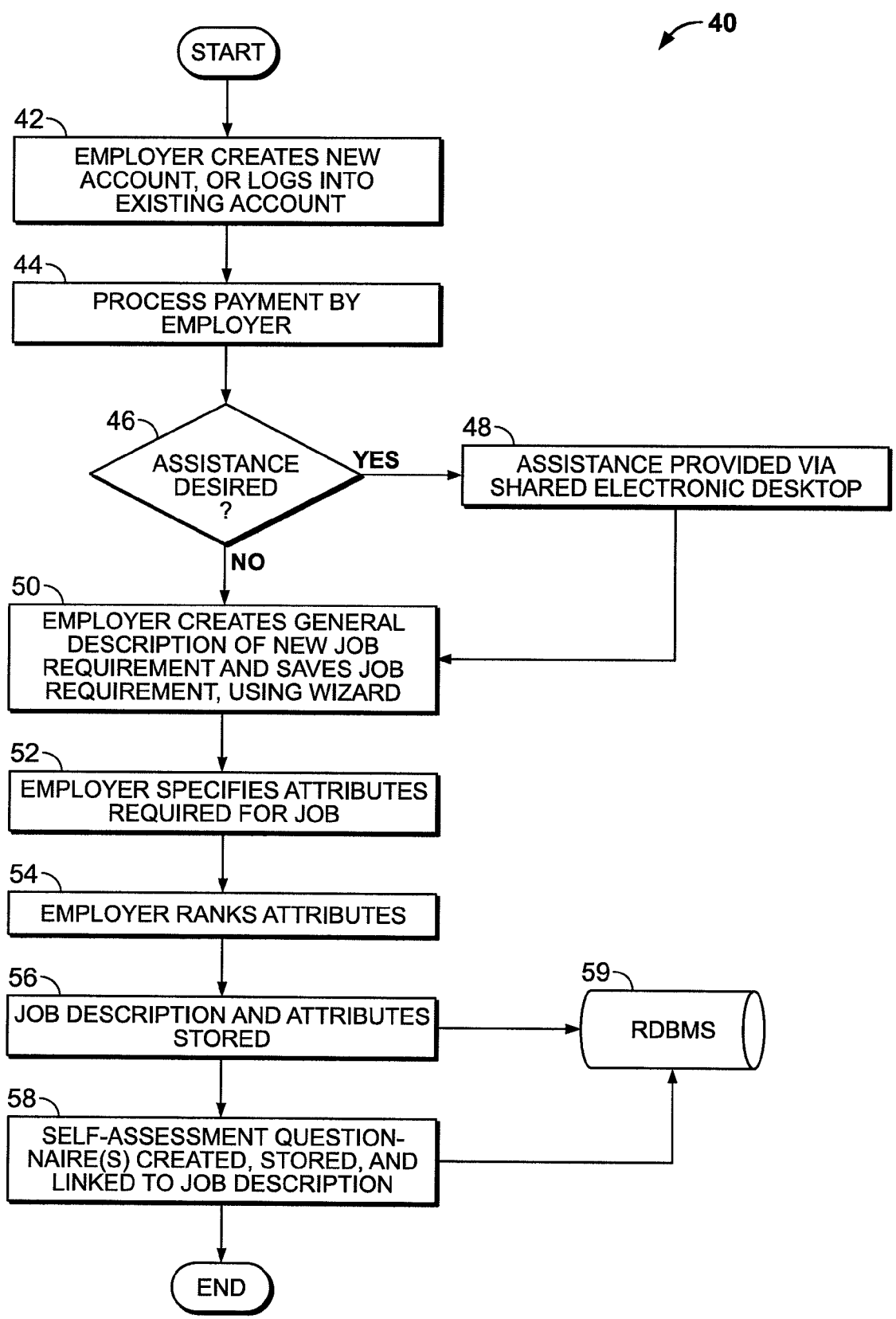
FIG. 2 is a flowchart showing processing steps according to the present invention for allowing an employer to create an account and to post a job description and associated questionnaires to be completed by potential employees.

FIG. 2 is a flowchart showing processing steps according to the present invention, indicated generally at 40, for allowing an employer (e.g., the employers 20a-20b of FIG. 1) to create an account with the server 10 and to create and post a job description and associated questionnaires to be completed by potential employees (e.g., the potential employees 30a-30c of FIG. 1). Beginning in step 42, an employer creates a new account with the server 10, or logs into an existing account. Access to the server 10 by the employer is preferably by way of customized web pages generated in hypertext markup language (HTML) or extensible markup language (AML), using various web programming languages, including ASP, PHP, Javascript, etc., and rendered by a conventional web browser. It is also conceivable that a standalone computer program, having its own user interface, could be provided and executed locally (e.g., on the employer's local computer). In step 44, payment for accessing and using the system 10 is processed, Such payment could be by way of credit card, debit card, third-party payment service (e.g., PAYPAL®), etc., and could be in accordance with a subscription agreement between the employer and an operator of the present invention. In step 46, a determination is made as to whether the employer wishes to be provided with assistance for creating a job posting and one or more questionnaires to be completed by potential employees. If a positive determination is made, step 48 occurs, wherein the employer is provided with such assistance by way of a shared electronic desktop wherein an operator of the system of the present invention can provide assistance by remotely viewing the computer desktop of the employer and guiding the employer through the various screens (discussed hereinbelow) for creating a job posting and one or more questionnaires. Otherwise, if a negative determination is made, control passes to step 50.

In step 50, the employer creates a general description of a new job requirement, and saves the job requirement, using a series of "wizards" which guide the employer through pertinent computer screens associated with creating a new job requirement. In step 52, once the new job requirement has been created, the employer specifies attributes required for the job. Examples of such attributes include, but are not limited to, required level of education, previous work experience, government/military security clearance, etc. In step 54, the employer ranks the attributes using a numeric scale 1 through n (n being any integer), wherein 1 represents an attribute most important to the employer, and n represents an attribute least important to the employer. Then, in step 56, the job description and attributes are stored in a relational database management system (RDBMS) 59 executing at the server 10 or on a separate database computing system, if desired. The RDBMS could be created and maintained using any suitable commercial relational database software package, such as ORACLE®, MICROSOFT® SQL SERVER, MySQL, etc., without departing from the spirit or scope of the present invention.

In step 58, the employer creates one or more self-assessment questionnaires to be completed by a potential employee, which is then stored in the RDBMS 59 and linked to the job description previously created by the employer. The questionnaire could request personal contact information from each potential employee, as well as a list of past references, a digital copy of a resume, and answers to questions associated with the job attributes defined (and ranked) by the employer. Processing shown in FIG. 2 is then complete once the questionnaire is created, stored in the RDBMS 59, and linked to the job description.

Figure 3:
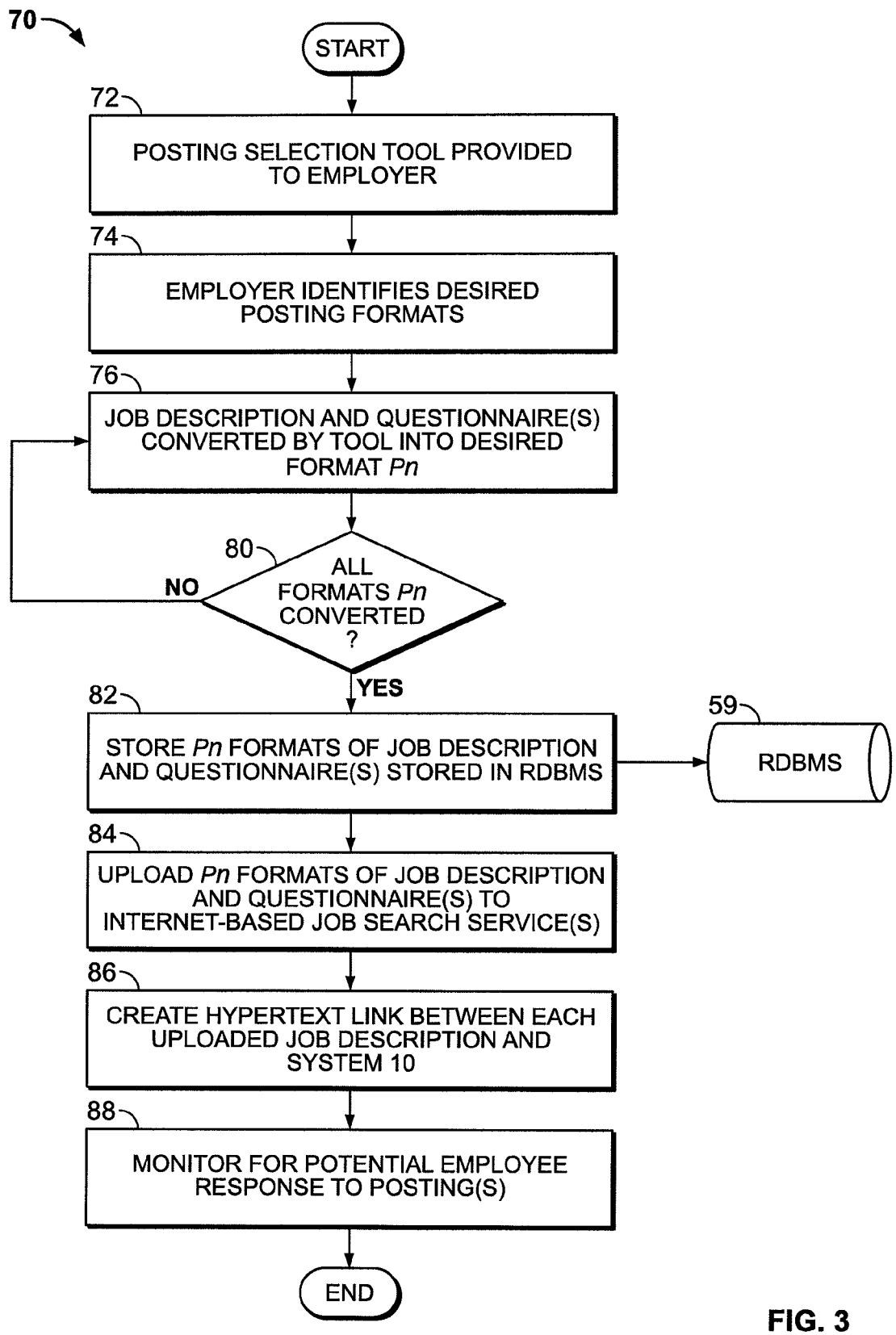
FIG. 3 is a flowchart showing processing steps according to the present invention, for allowing an employer to post a job description and associated questionnaire(s) with one or more Internet-based job services.

FIG. 3 is a flowchart showing processing steps according to the present invention, indicated generally at 70, for allowing an employer (e.g., the employers 20a-20b of FIG. 1) to post a job description and associated questionnaire(s) with one or more Internet-based job services (e.g., the job service 34 of FIG. 1), or for posting through traditional print media (e.g., newspapers, periodicals, etc.) In step 72, the employer is presented with a job posting selection tool, which allows the employer to select one or more desired Internet-based job services (e.g., MONSTER.COM®, CARREERBUILDER-.COM®, or other service), or traditional print media, through which to post the job description and questionnaire(s). In step 74, the employer identifies a desired format for posting the job description and questionnaire(s). The desired format is tailored for a target job posting service, and for a desired method of delivery, such as e-mail "blasts," print media, etc. In step 76, the job description and questionnaire(s) are converted into the desired format using the selection tool. In step 80, a determination is made as to whether the job description and questionnaire(s) have been converted into all desired formats $P_n$. If a negative determination is made, step 76 is repeated so that additional formats can be converted.

For each format $P_n$, a unique identifier is created so that a potential candidate responding to the job description can be tracked and captured in the RDBMS 59. If a web-based format job description is created, it can contain code within the posting that captures how many viewers have looked at the post, how many viewers clicked on the questionnaire link, and other data. If an e-mail format job description is created, a unique link can be created for each e-mail sent out, which identifies the individual who clicks on the link in the mail as well as the questionnaire(s). If a print format job description is created, a unique phone number or other identifier (e.g., e-mail address, web link, etc.) can be created to identify the source of the respondent. This data capture process provides the employer with analytical data with which to make intelligent decisions about the hiring process, as well as optimal locations to post the most effective job descriptions. This information can be exported for use with other programs (including statistical analysis software packages), and it can be summarized on a periodic basis (e.g., daily, hourly, etc.) in report format.

In step 82, after all of the desired formats have been created/converted, they are stored in the RDBMS 59. The job posting and questionnaire(s) could be stored in any desired format in the RDBMS 59, such as extensible markup language XML) format, PDF, Microsoft Office, etc. Then, in step 84, the $P_n$ formats of the job description and questionnaire(s) are uploaded to the Internet-based job search service. If the Internet-based job search service allows for integration with the system 10, the posting could occur automatically (e.g., on a scheduled basis). If a print-based job posting is desired, the job posting is communicated (e.g., by e-mail, facsimile, regular mail) to the recipient, such as a newspaper, periodical publisher, etc. In step 86, a hypertext link is created between each uploaded job description and the system 10 of the present invention. In step 88, the system monitors for potential employee responses to the posting.

Figure 4:
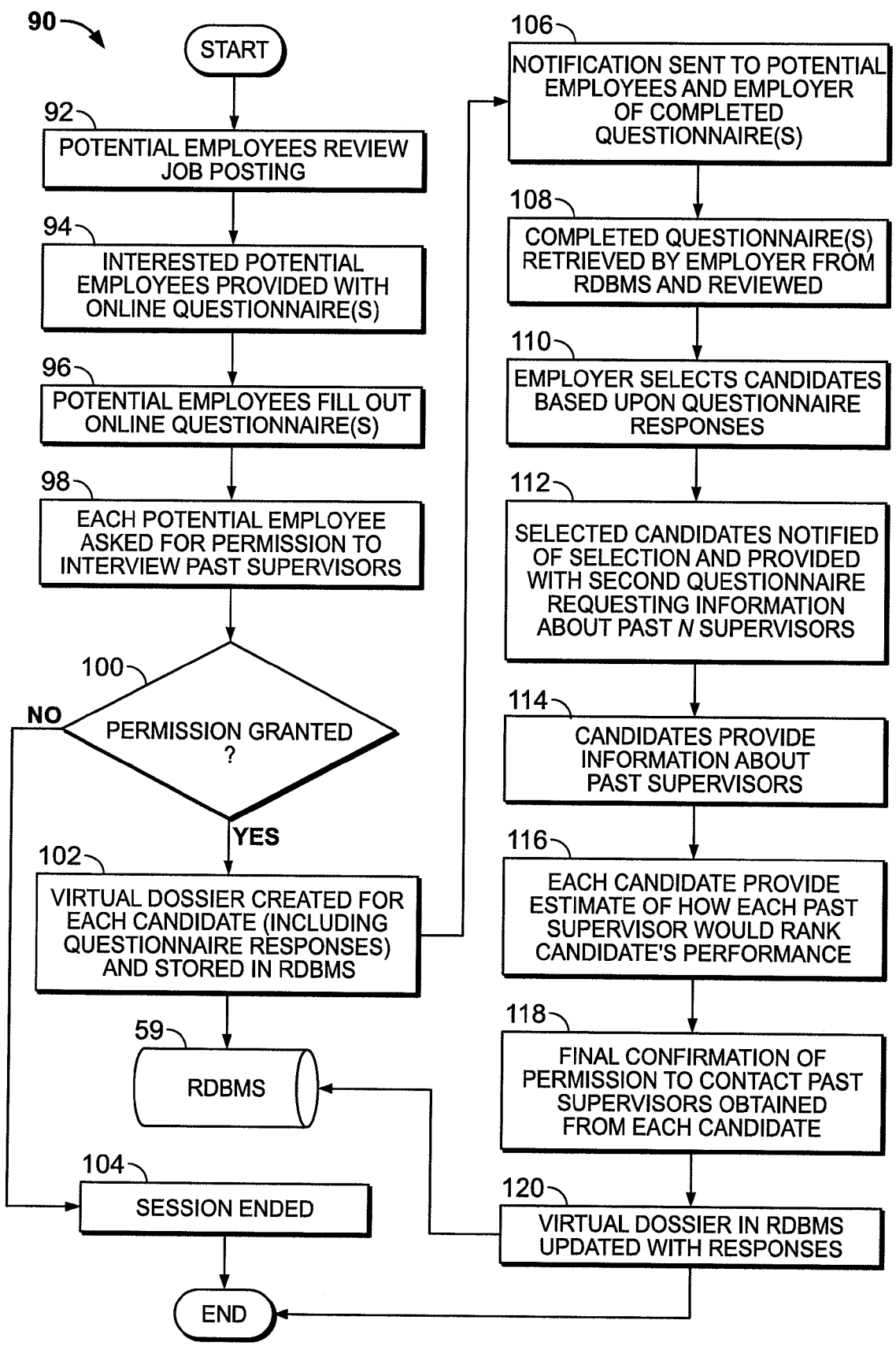
FIG. 4 is a flowchart showing processing steps according to the present invention for collecting responses to job postings and questionnaires by potential employees.

FIG. 4 is a flowchart showing processing steps according to the present invention, indicated generally at 90, for collecting responses to job postings and questionnaires by potential employees. In step 92, a potential employee reviews a job posting. The posting could be viewed using an Internet-based search service (e.g., the search service 34 of FIG. 1), or in a newspaper or periodical. In step 94, an interested potential employee is presented with one or more online questionnaires relating to the job. In step 96, the potential fills out the online questionnaire. Information solicited could include, but is not limited to, contact information, previous experience, and specific job-related questions specified by the employer (e.g., proficiency/experience with specific programming languages, project management experience, etc.). Optionally, the online questionnaire could allow a potential employee to attach and upload documents/files of various types, such as examples of work product, audio files, video files, etc., which relate to questions asked in the questionnaire. In step 98, each potential employee is asked for permission to conduct interviews of previous employers/supervisors of the potential employee. In step 100, a determination is made as to whether the potential employee consents to such interviews. If a negative determination is made, step 104 occurs, wherein the session is ended by notifying the potential employee that interviews of previous employers/supervisors are required by the employer. By requiring background interviews, the present invention reduces potentially undesirable hiring candidates. Otherwise, if the potential employee consents to background interviews, step 102 occurs, wherein a virtual dossier is created for each candidate, which includes the candidate's responses to the questionnaire. The virtual dossier is stored in the RDBMS 59, and provides a virtual personnel file similar to a real, paper file.

In step 106, a notification is sent to each potential employee and the employer of the availability of completed questionnaire(s) for review. In step 108, the completed questionnaire(s) of each potential employee are retrieved by the employer from the RDBMS 59 and reviewed. Then, in step 110, the employer selects desired candidates based upon the questionnaire responses, thus narrowing down the pool of potential employees in a first review phase. In step 112, selected candidates are notified of their selection (e.g., by e-mail), and are provided with a second questionnaire requesting information about the candidate's past N employers/supervisors, N being any desired integer. Information solicited about the candidate's past employers/supervisors could include, but is not limited to, the candidate's beliefs as to how the past employers/supervisors would rank the candidate's job performance, etc. Then, in step 114, each candidate provides the solicited information about the candidate's past employers/supervisors, including the candidate's own evaluations of past employers/supervisors. In step 116, each candidate provides an estimate of how each past supervisor would rank the candidate's overall job performance. In step 118, final confirmation is obtained of the each candidate's permission to contact past employers/supervisors. In step 120, the virtual dossier of each candidate is updated with the candidate's responses to the second questionnaire. The responses to the second questionnaire could be analyzed for variance (e.g., using statistical analysis software), and copies of the questionnaire responses could be e-mailed to the candidates, along with confirmation of the candidate's consent to contact past employers/supervisors.

Figure 5:
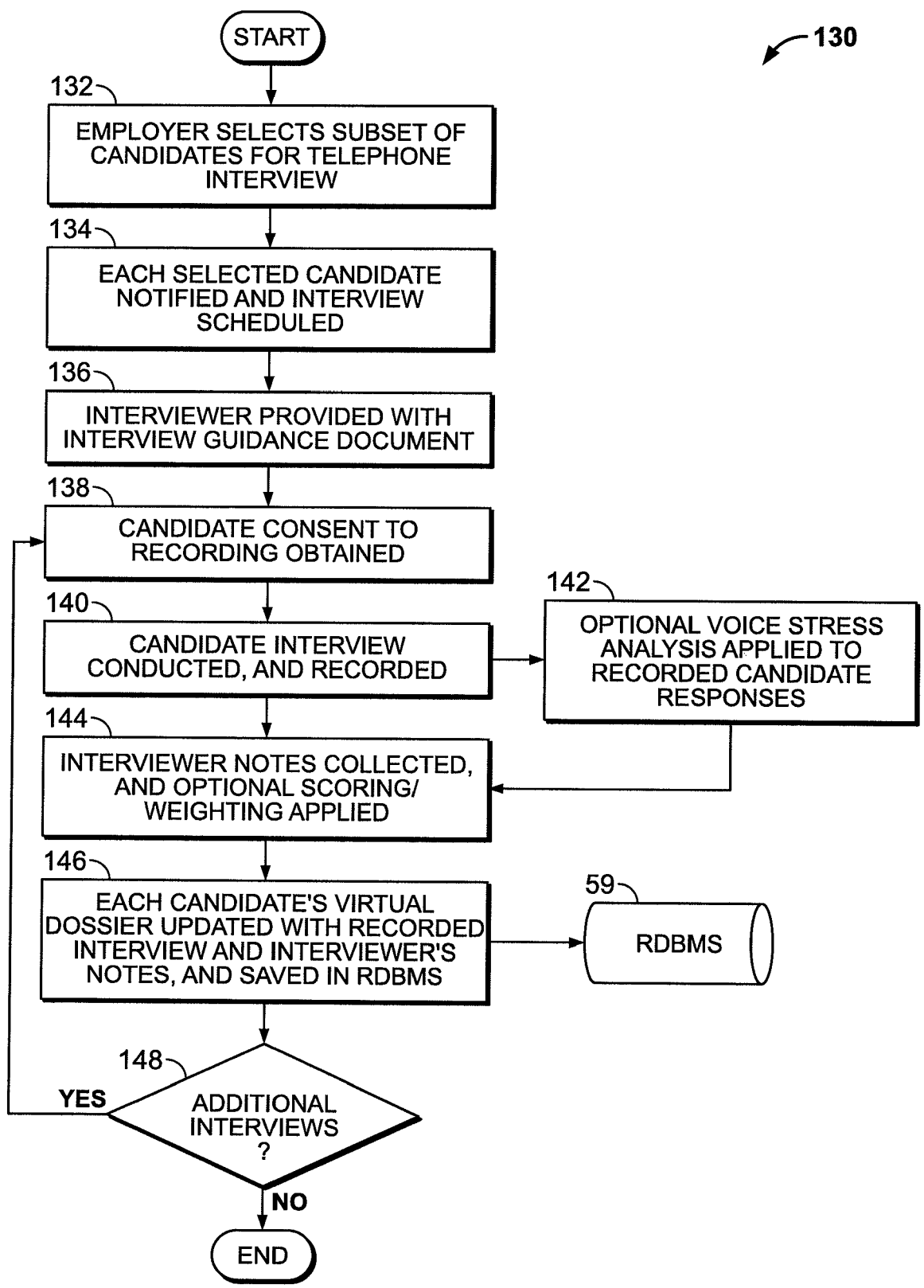
FIG. 5 is a flowchart showing processing steps according to the present invention for facilitating telephonic interviews of selected candidates.

FIG. 5 is a flowchart showing processing steps according to the present invention, indicated generally at 130, for facilitating telephonic interviews of selected candidates. In step 132, the employer reviews the updated virtual dossiers of each candidate, and selects a subset of candidates for a telephone interview. In step 134, each selected candidate is notified of their selection (e.g., via e-mail, telephone, etc.), and is requested to contact an operator of the system 10 of the present invention to schedule an interview. The interview could also be scheduled using a web-based calendar system generated by the server 10. Once an interview has been scheduled, the interviewer (e.g., an employee associated with an operator of the present invention) is provided in step 136 with a guidance document for use in conducting the interview. Such a document could include pre-defined questions specified by the employer, as well as standard questions that are to be asked of all candidates. A unique identifier could be generated for each guidance document, and the document could be printed for use during the interview, if desired. In step 138, each candidate dials a telephone number associated with the present invention, initiates the interview process, and is requested to consent to recording of the interview. In step 140, the candidate is interviewed in a telephonic interview, which is recorded (e.g., using commercially-available voice recording software). Optionally, in step 142, voice stress analysis could be conducted on the recorded interview (using commercially-available stress analysis software) to ascertain whether the candidate's responses to questions posed by the interviewer are truthful. In step 144, the interviewer's notes are collected (e.g., the interviewer could be provided with a screen by the server 10 for entering notes during the interview (which could be linked or "bookmarked" to the candidate's virtual dossier), or paper notes could be collected, scanned, and converted to electronic format using optical character recognition (OCR) or data entry personnel). Optionally, the interviewer could be asked to score or weight the candidate's performance during the interview. In step 146, each candidate's virtual dossier is updated with the recorded interview and the interviewer's notes (in electronic format), which are stored in the RDBMS 59. Finally, in step 148, a determination is made as to whether additional telephone interviews are to be conducted. If so, processing repeats at step 138; otherwise, processing ends. It is noted that the telephonic interview could also be conducted over the Internet (using commercially-available videoconferencing software), and could include video. Similar to the voice stress analysis in step 142, visual behavioral analysis can be performed with the recorded video.

Figure 6:
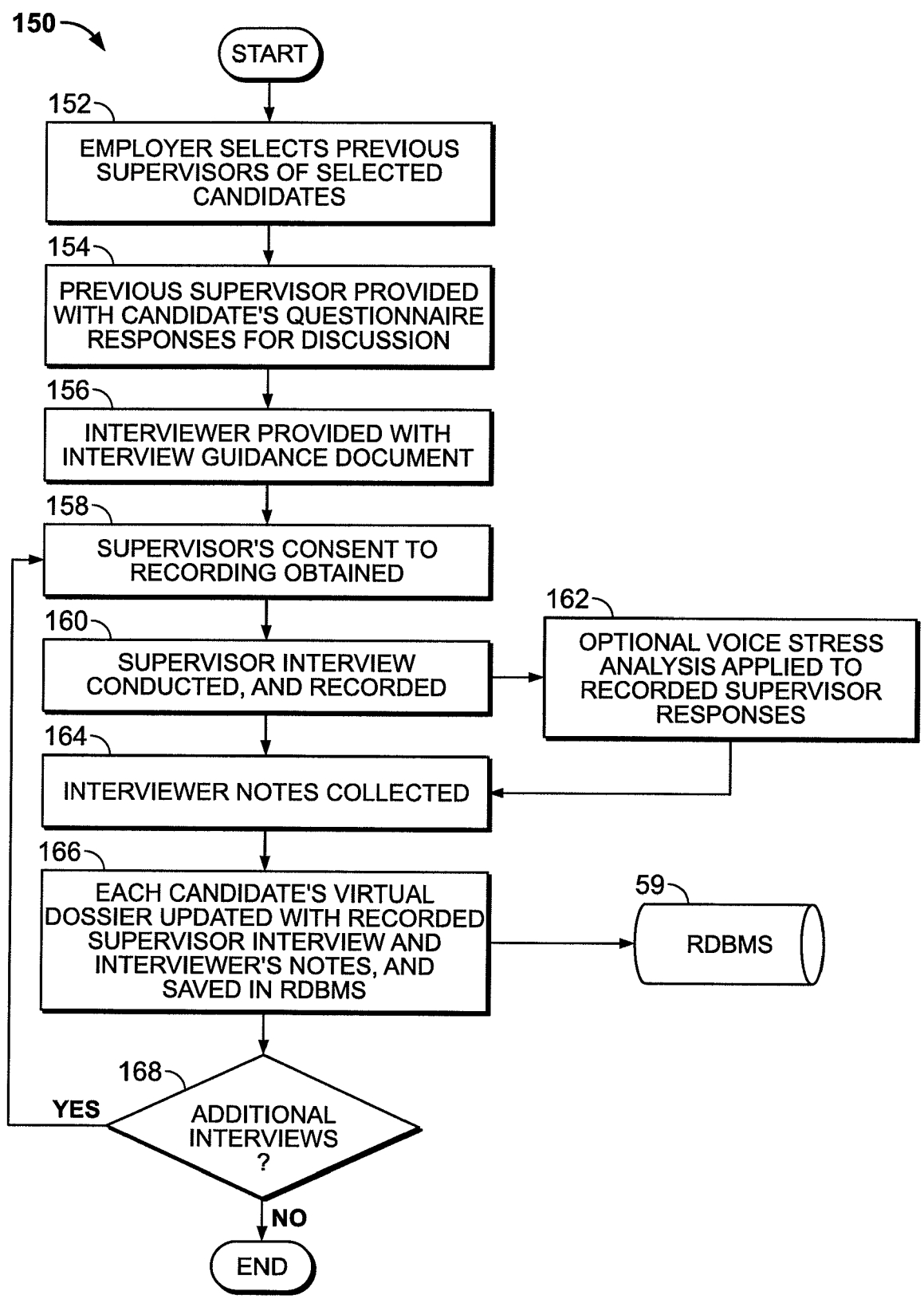
FIG. 6 is a flowchart showing processing steps according to the present invention for facilitating telephone interviews of a candidate's previous employers/supervisors.

FIG. 6 is a flowchart showing processing steps according to the present invention, indicated generally at 150, for facilitating telephone interviews of a candidate's previous employers/supervisors. In step 152, the employer reviews the updated virtual dossiers of each candidate, and selects desired previous employers/supervisors for a telephone interview. In step 154, each selected employer/supervisor is notified of their selection (e.g., via e-mail, telephone, etc.), is requested to contact an operator of the system 10 of the present invention to schedule an interview, and is provided with a copy of the candidate's questionnaire responses relating to the employer/supervisor. The interview could also be scheduled using a web-based calendar system generated by the server 10. By providing the employer/supervisor with the questionnaire responses, the employer/supervisor can provide feedback on the accuracy of the candidate's responses, thus providing a useful way of evaluating the candidate's truthfulness. Once an interview has been scheduled, the interviewer (e.g., an employee associated with an operator of the system 10 of the present invention) is provided in step 156 with a guidance document for use in conducting the interview. Such a document could include pre-defined questions specified by the employer, as well as standard questions that are to be asked of all candidates. In step 158, each past employer/supervisor dials a telephone number associated with the present invention, initiates the interview process, and is requested to consent to recording of the interview. In step 160, the employer/supervisor is interviewed in a telephonic interview, which is recorded (e.g., using commercially-available voice recording software). Optionally, in step 162, voice stress analysis could be conducted on the recorded interview (using commercially-available stress analysis software) to ascertain whether the responses of the employer/supervisor to questions posed by the interviewer are truthful. If video is available, behavioral analysis ("body language" analysis) can be performed. In step 164, the interviewer's notes are collected (e.g., the interviewer could be provided with a screen by the server 10 for entering notes during the interview (which could be linked or "bookmarked" to the candidate's virtual dossier), or paper notes could be collected, scanned, and converted to electronic format using optical character recognition (OCR) or data entry personnel). In step 166, each candidate's virtual dossier is updated with the recorded interview and the interviewer's notes (in electronic format), which are stored in the RDBMS 59. Finally, in step 168, a determination is made as to whether additional telephone interviews are to be conducted. If so, processing repeats at step 158; otherwise, processing ends. Contact information for each employer/supervisor (e.g., e-mail addresses, telephone numbers, mailing addresses, etc.) could be collected by the present invention prior to conducting an interview, to provide a way for marketing the services provided by the present invention to such individuals.

Figure 7:
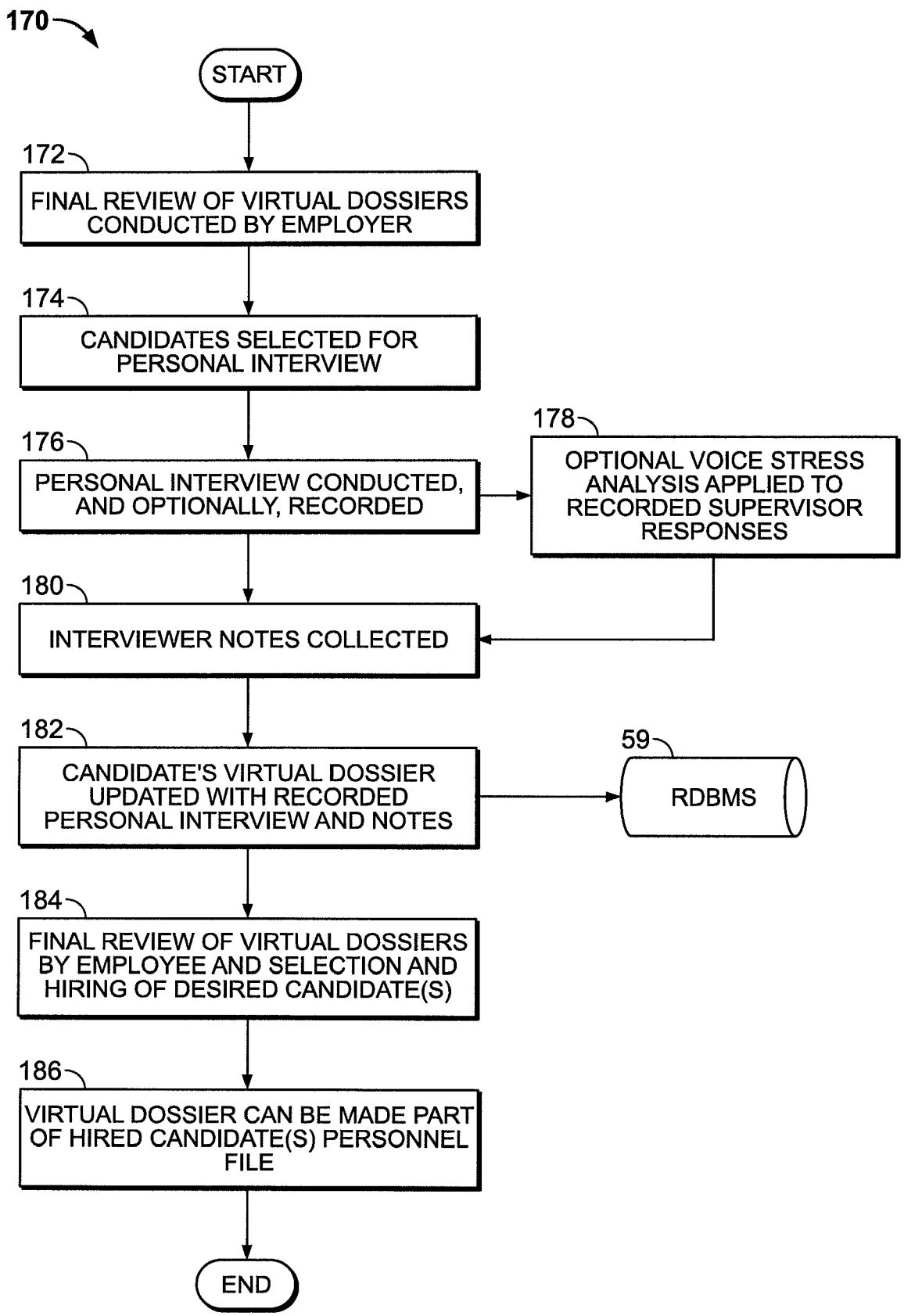
FIG. 7 is a flowchart showing processing steps according to the present invention for conducting an in-person (personal) interview with selected candidates.
Figure 9B:
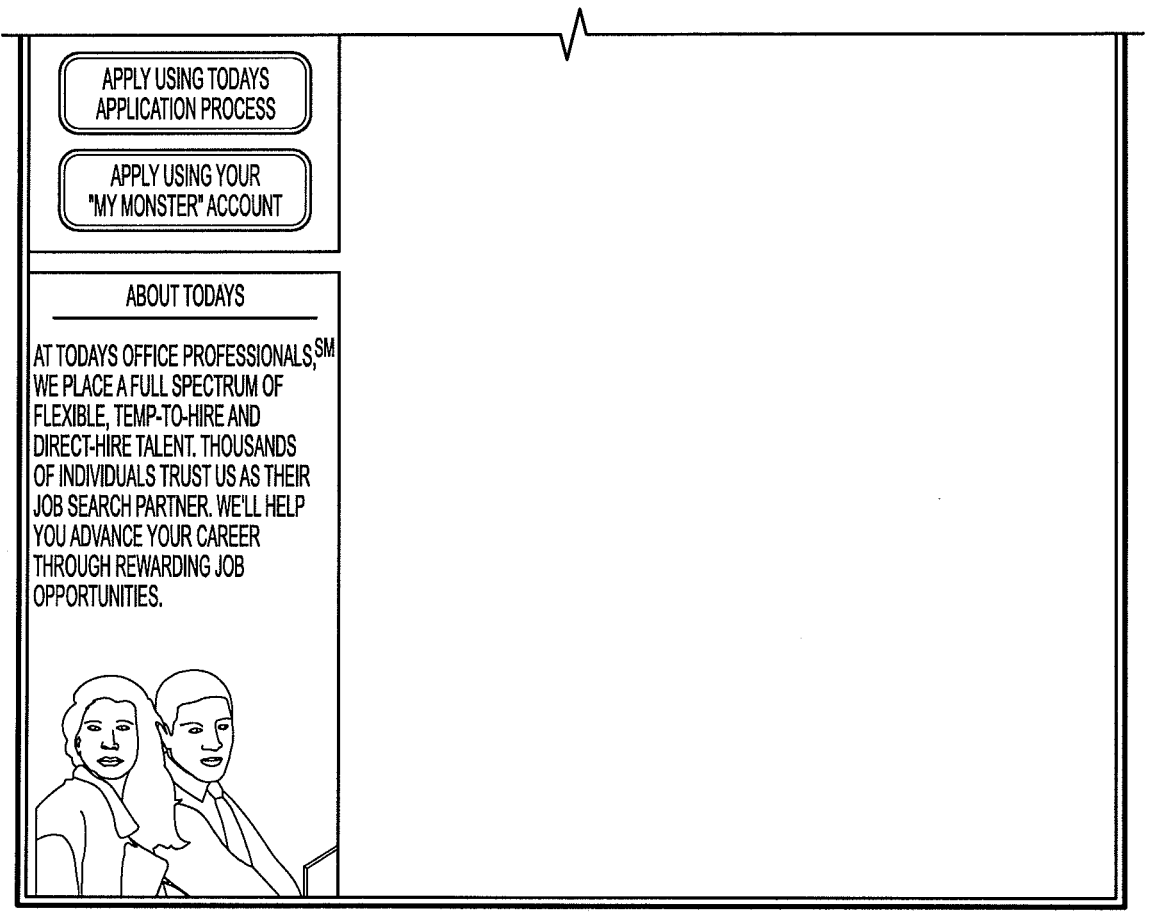

FIG. 7 is a flowchart showing processing steps according to the present invention, indicated generally at 170, for conducting an in-person (personal) interview with selected candidates. In step 172, an employer reviews the updated virtual dossiers of candidates, which includes the recorded interviews of the candidate and his or her previous employers/supervisors. In step 174, one or more candidates is selected for an in-person interview, based upon the employer's review of the updated virtual dossiers. In step 176, the in-person interview is conducted, and optionally, is recorded (e.g., video file). If recorded, the in-person interview could be processed in step 178 using voice stress analysis software to ascertain the truthfulness of the candidate's responses. If a video file is available, the video may be reviewed for body language analysis and said analysis can be added to the virtual dossier. In step 180, the interviewer's notes are collected (e.g., the interviewer could be provided with a screen by the server 10 for entering notes during the interview (which could be linked or "bookmarked" to the candidate's virtual dossier), or paper notes could be collected, scanned, and converted to electronic format using optical character recognition (OCR) or data entry personnel). In step 182, the recorded, in-person interview, as well as the interviewer's notes, are stored in the virtual dossier and the RDBMS 59 is updated. In step 184, a final review of the virtual dossiers is conducted by the employer, and one or more desired candidates is selected for hiring based upon the final review. Finally, in step 186, the virtual dossier(s) of the hired candidate(s) can be made part of the personnel file(s) of the hired candidate(s), allowing for convenient access to a summary of the recruitment and evaluation processes for the hired candidate(s).

It is noted that the virtual dossiers generated by the present invention could include Digital Rights Management (DRM) software which secures the dossiers and controls access and usage privileges of users. For example, the DRM software could specify that only specific individuals have the right to alter or modify a virtual dossier, such as an employer or hiring manager. The virtual dossiers could be preserved in digital format (e.g., on the server 10, or on one or more computing systems of the employers 20a-20b of FIG. 1), and they can also be printed and filed. Importantly, at any point during the recruitment and evaluation process, an employer can access a virtual dossier and provide comments therein, allowing the employee to contemporaneously record information which can be reviewed by other individuals when the virtual dossier is accessed. Additions, changes, and deletions can be tracked, and each item of information can be tagged using unique identifiers so as to facilitate tracking and querying of information in the future. Also, other individuals associated with a potential employee, such as co-workers, could be interviewed using the present invention, and other investigation techniques (such as credit checks, drug screening processes, subordinate reviews given by a candidate, etc.) could be implemented as part of the recruitment and evaluation processes of the present invention.

Figure 8B:
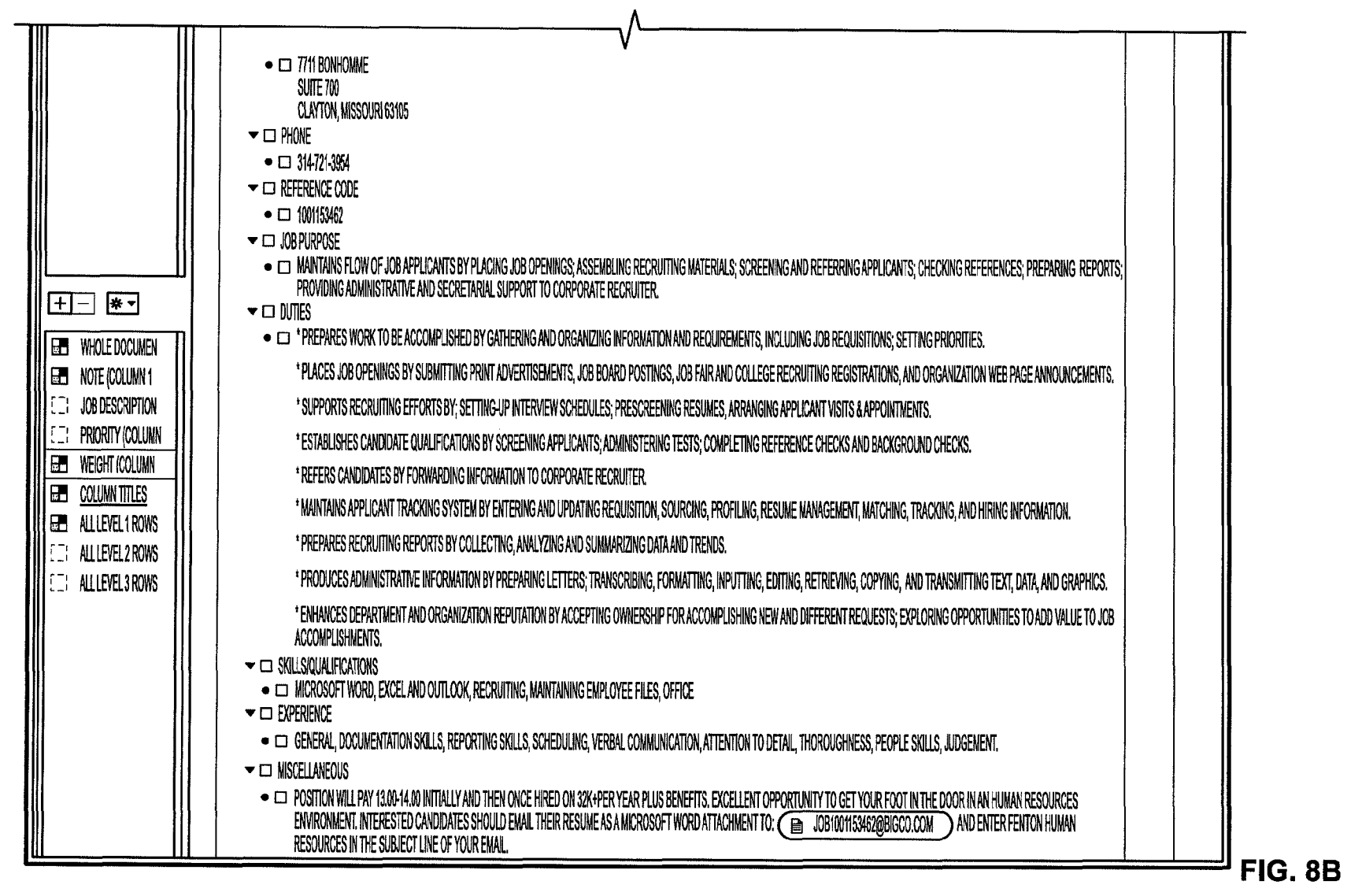

FIGS. 8A-8B are screenshots showing a user interface screen generated by the present invention for allowing an employer (e.g., the employers 20a-20c of FIG. 1) to create a job description to be stored on the server 10. As can be seen, the screen allows an employer to define a plurality of job attributes, such as company name, location, salary/wage, status (e.g., full-time, part-time), job category, career level, industry, education level, occupation description, contact information, reference code associated with a job, description of job purpose, duties associated with a job, skills/qualifications, job experience, and miscellaneous information associated with a job. The supplied information can be presented, stored, and accessed using an expandable "tree" configuration, as shown.

FIGS. 9A-10B are screenshots showing completed job descriptions as posted on the MONSTER.COM job search website (see FIGS. 9A-9B) and the CAREERBUILDER.COM job search website (see FIGS. 10A-10B). When an interested candidate clicks the buttons on these screens for applying for the job, the candidate is directed to the web environment generated by the present invention.

FIGS. 11-22 are screenshots generated by the server 10 of the present invention for allowing an employer (e.g., the employers 20a-20b of FIG. 1) to create and manage questionnaires (surveys) associated with a job description, to be answered by candidates.

Figure 11:
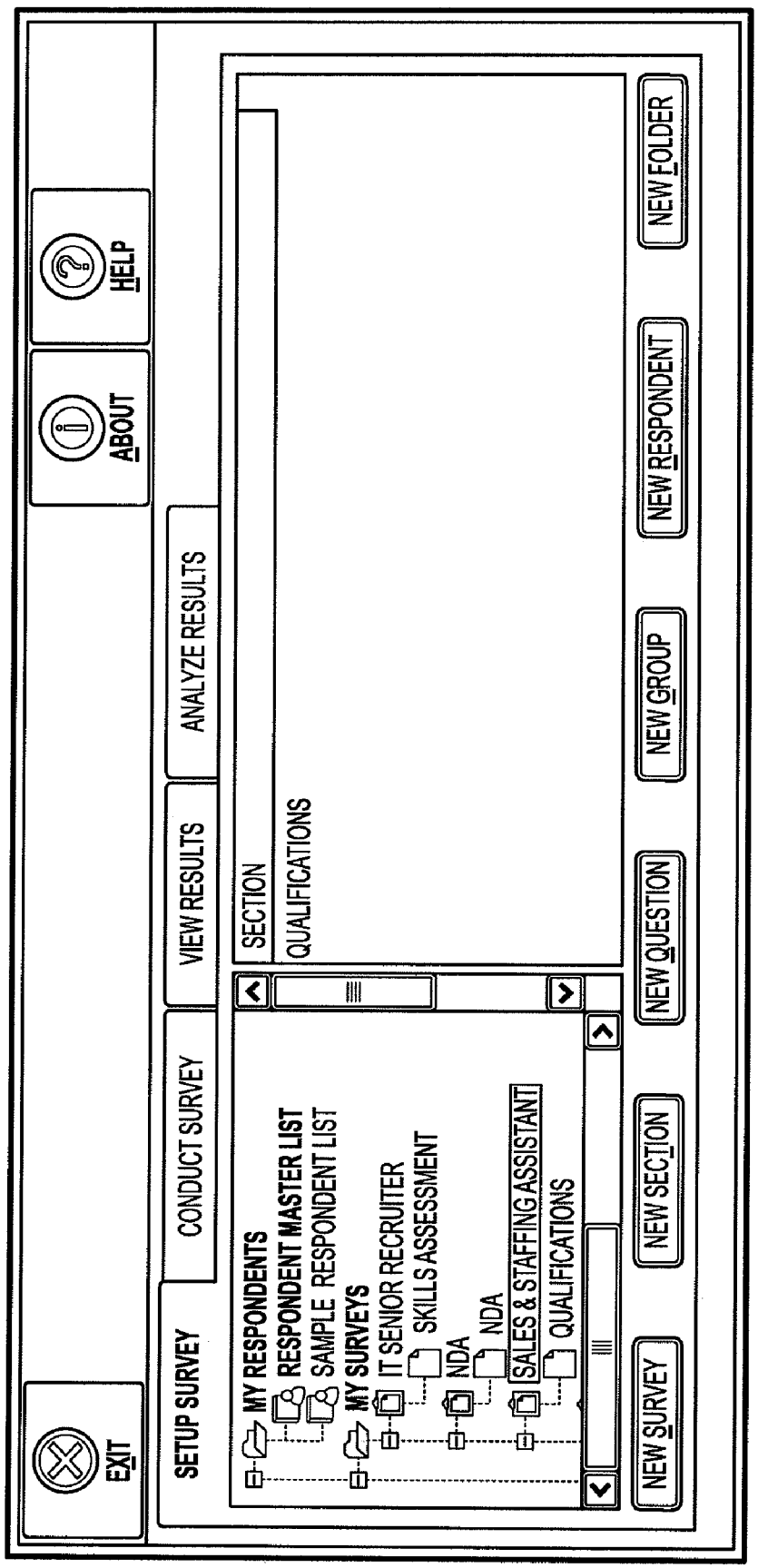

The screen shown in FIG. 11 allows an employer to begin the process of creating a survey, by clicking on the "New Survey" button. A list of active surveys is provided in the left-hand window pane, and detailed information about a selected survey is provided in the right-hand window pane. Using the screen shown in FIG. 11, an employer can also create new sections for a desired survey, as well as new questions to be included in the survey. Also, an employer can create a new group of respondents (i.e., candidates) to which the survey is to be directed, as well as add respondents to an existing group and create file folders associated with a group.

Figure 12:
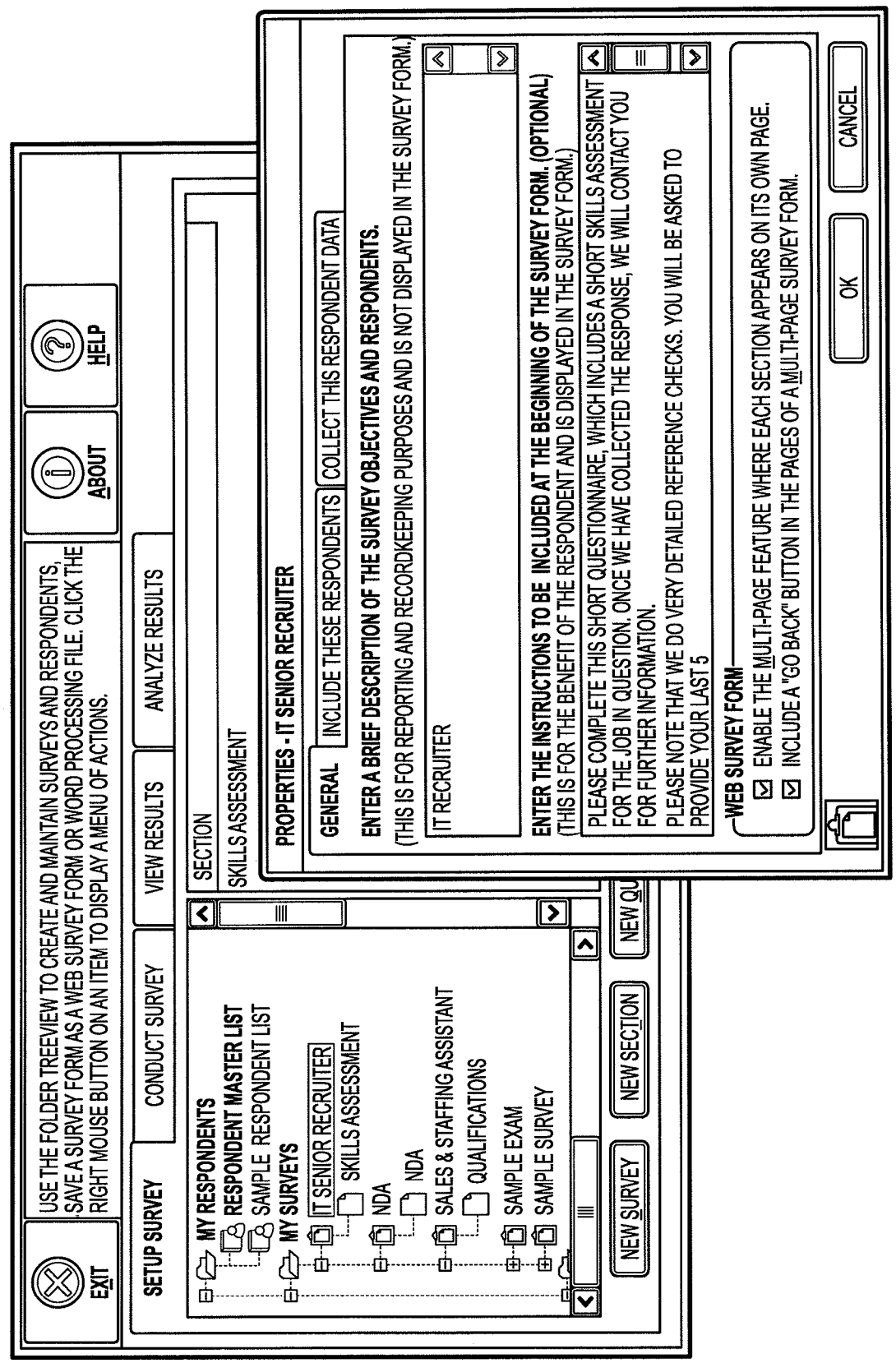

The screen shown in FIG. 12 allows an employer to provide detailed information to be included in a survey. By clicking on the "General" tab, the employer is provided with fields for entering a brief description of survey objectives and target respondents, as well as optional instructions to be provided to the target respondents. Checkboxes allow the employer to specify whether the survey is presented in multi-page format, and whether a "Go Back" button will be included to allow a respondent to navigate amongst multiple pages. The tabs "Include These Respondents" and "Collect This Respondent Data," discussed below, allow an employer to define specific respondents to receive the survey, as well as to specify information about a respondent to be collected in the survey.

Figure 13:
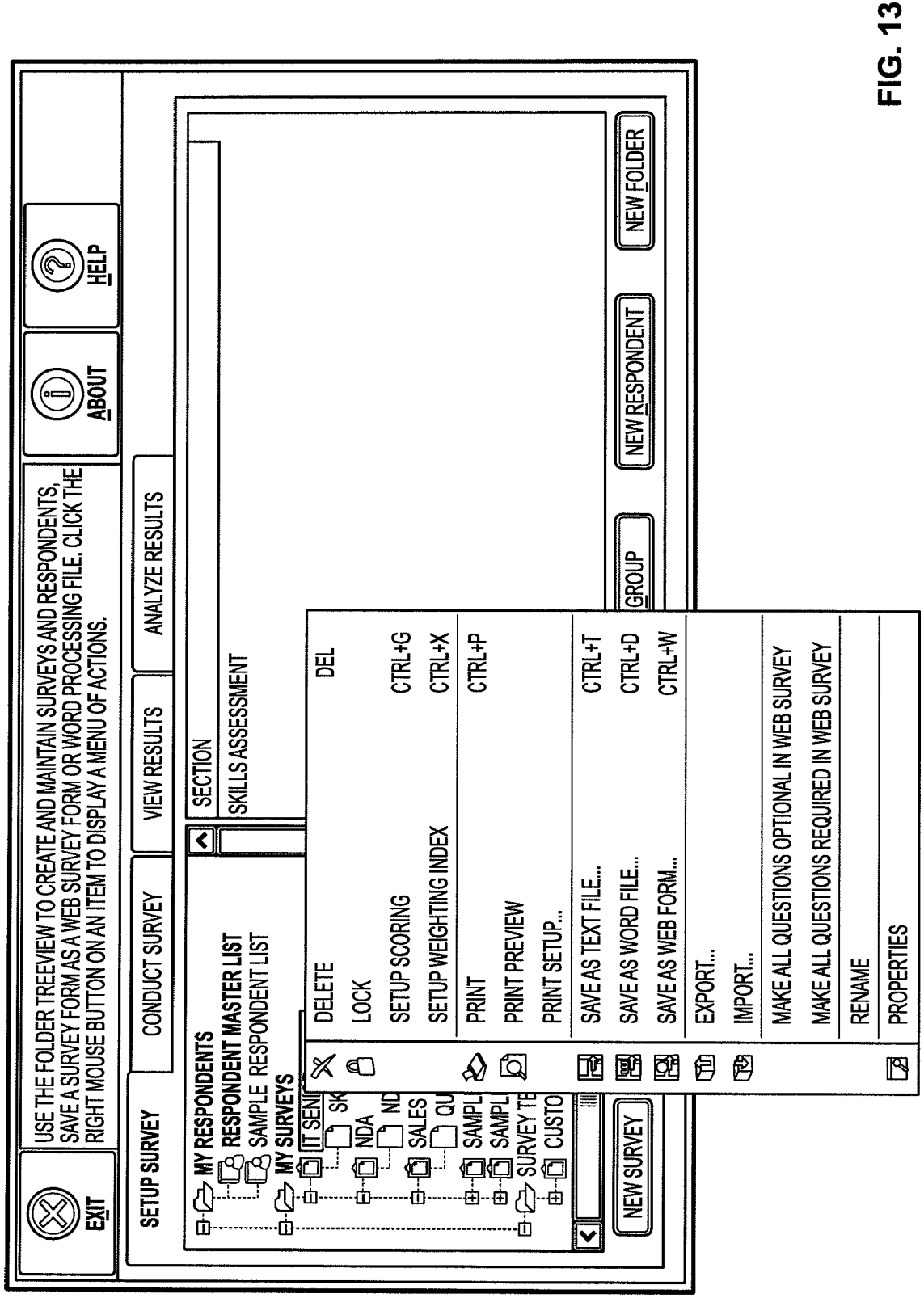

The screen shown in FIG. 13 provides an employer with a convenient menu of options for deleting a survey, locking a survey, setting up scoring and weighting index rules associated with a survey, printing a survey, saving/exporting/importing a survey, and changing question attributes (i.e., making all questions optional or required).

The screen shown in FIG. 14 allows an employer to define specific questions to be included in a survey and answered by a respondent. As can be seen, the questions could relate to specific job requirements, such as productivity, margins, sourcing of candidates, degree of technical knowledge, use of back-office processes, etc. Any desired number and type of question could be included in a survey.

Figure 15:
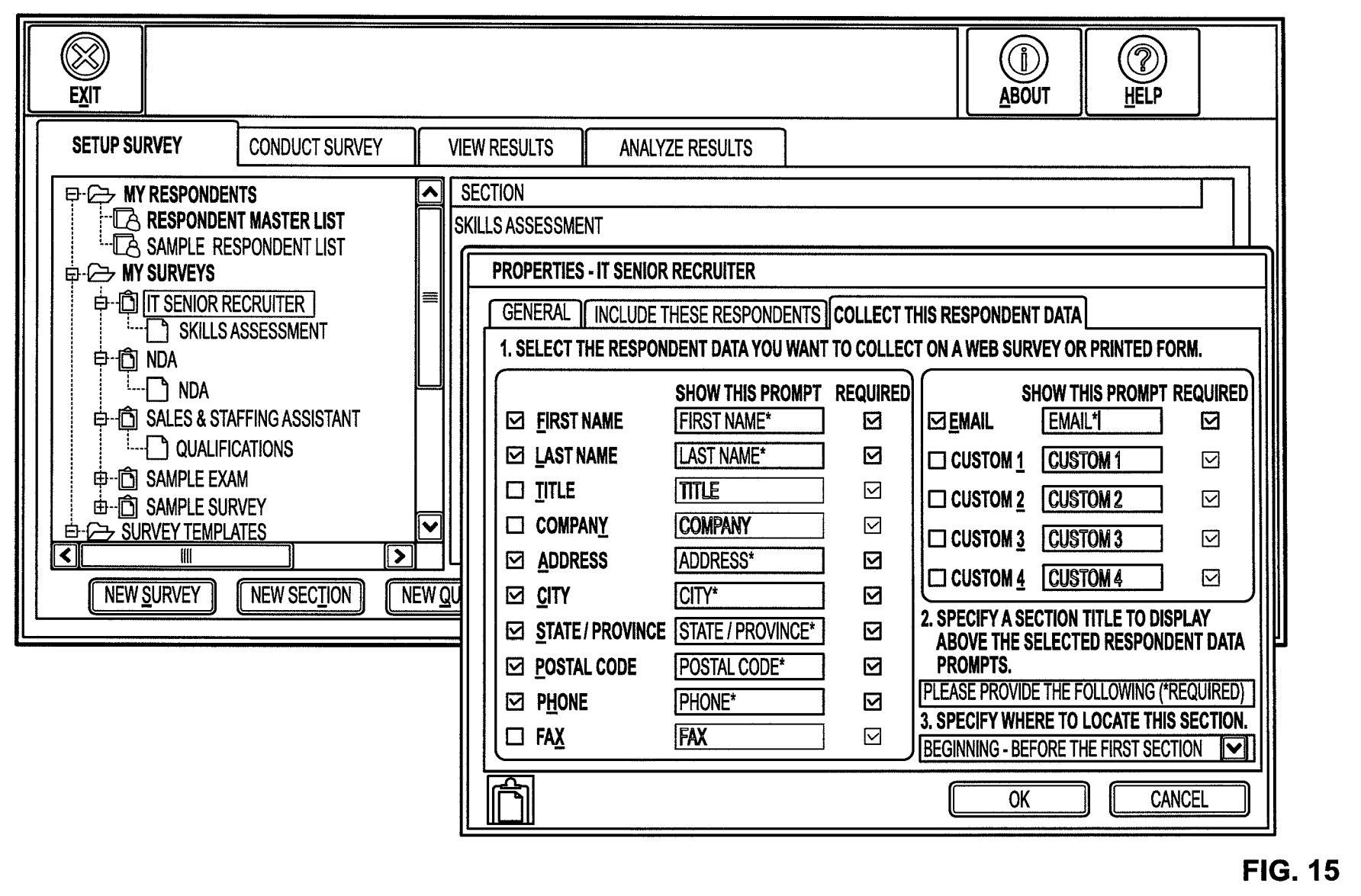

The screen shown in FIG. 15 allows an employer to collect specific respondent information. Such information could include, but is not limited to, first name, last name, title, company, address, city, state, postal code, phone and facsimile numbers, e-mail addresses, etc. Also, the employer can specify a section title to be displayed above data prompts in the survey, as well as a desired location within the survey at which to display the respondent data fields.

Figure 16:

The screen shown in FIG. 16 allows an employer to define a total point value for a survey, as well as points associated with questions within a survey. The points can be used by the employer to score a respondent's responses to the questionnaire, and can be varied as desired. Also, the screen in FIG. 16 allows the employer to provide an "optimal" answer to each question, i.e., an answer that the employer would like to see in response to the survey. This can be used for scoring respondents' responses to the questions of the survey. Optionally, an employer can choose to display the points associated with each question, when the survey is accessed by a respondent.

Figure 17:
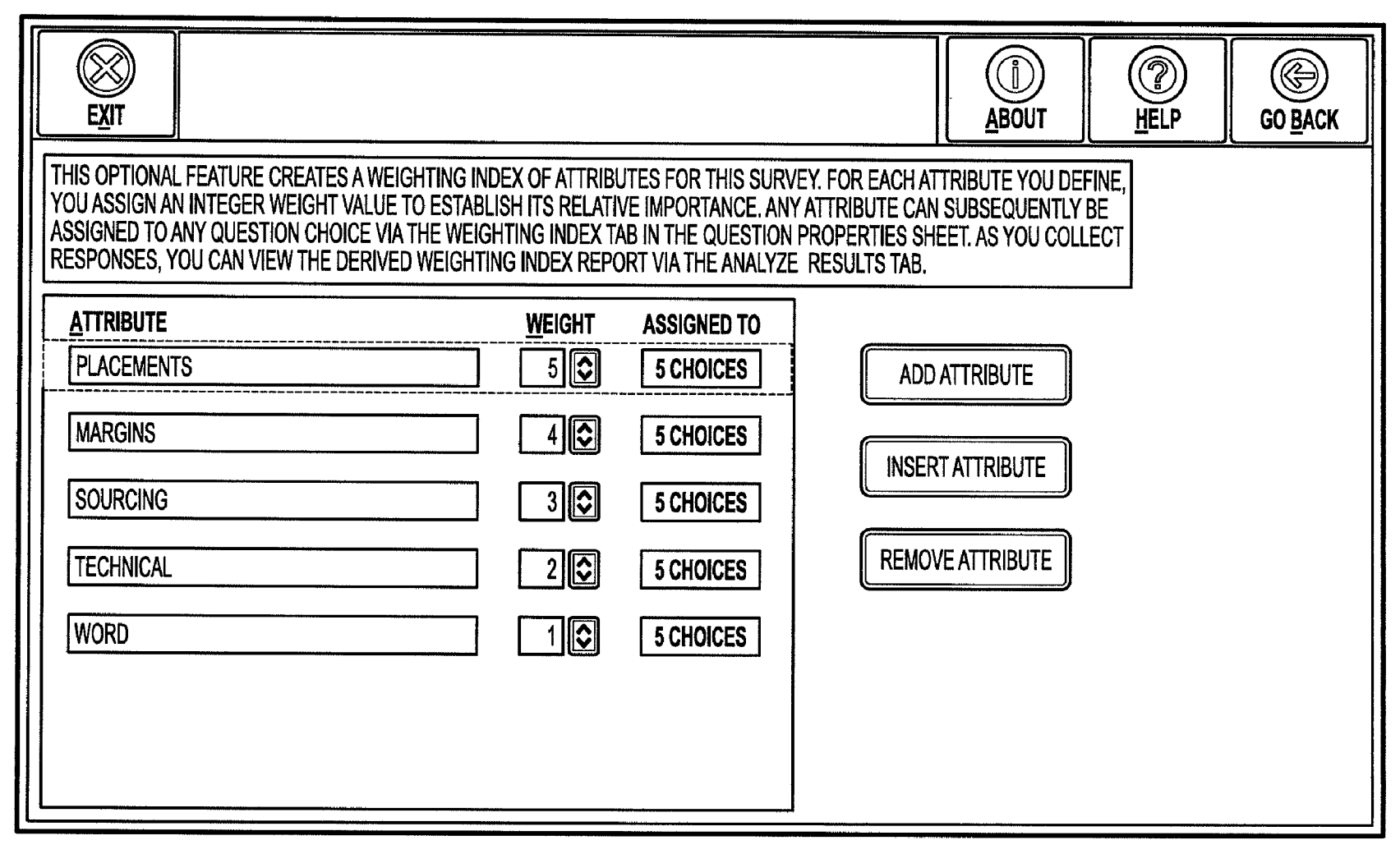

The screen shown in FIG. 17 allows an employer to create a weighting index of attributes for a survey. The weighting index represents an integer value which establishes the importance of a respondent's attribute relative to other attributes. Attribute weights can be assigned to specific questions, and any desired integer value can be assigned to an attribute.

Figure 18:
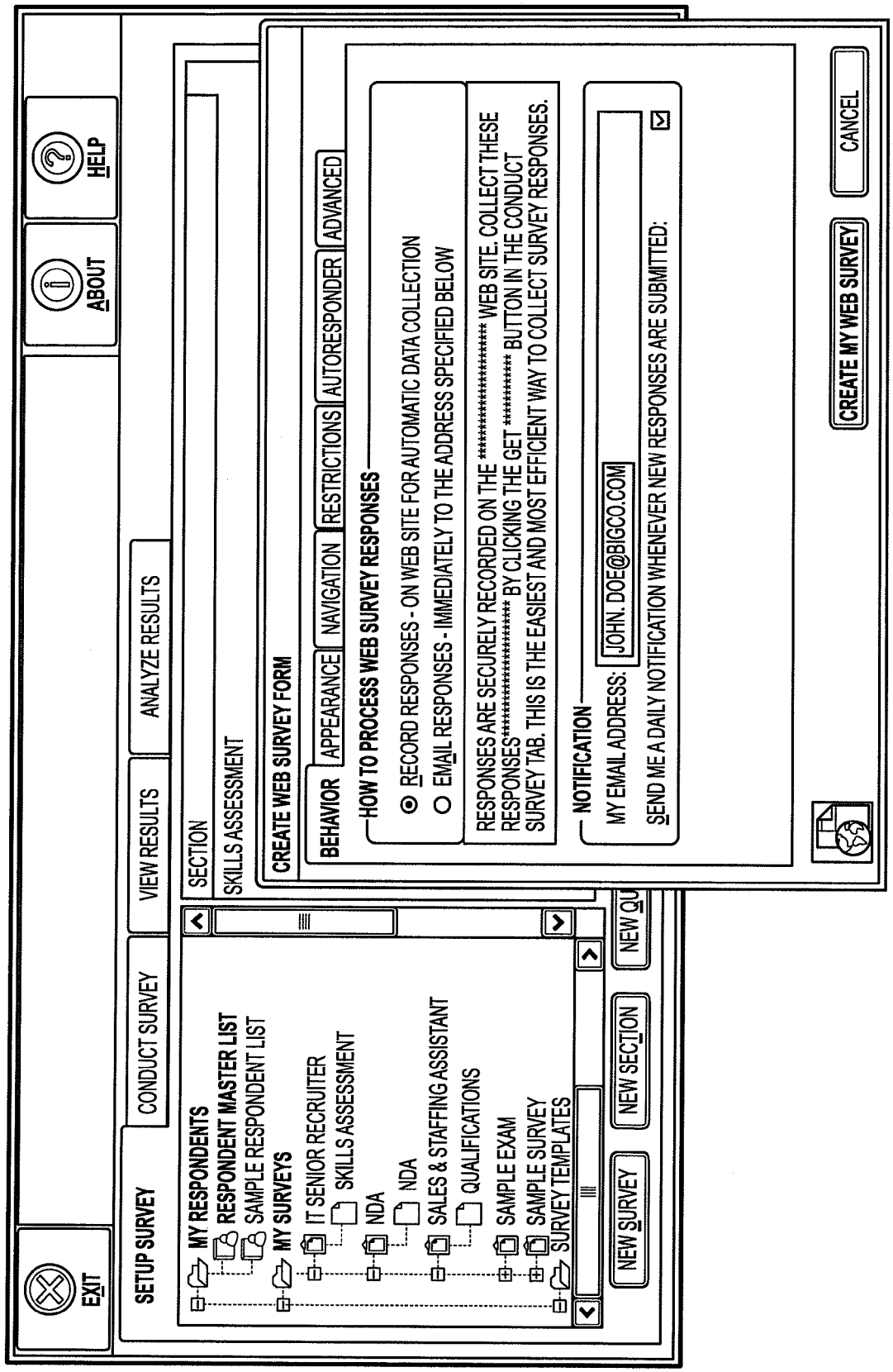

The screen shown in FIG. 18 allows an employer to change attributes associated with a survey, such as the behavior of a survey (i.e., whether response are automatically recorded on the server 10, or whether they are e-mailed to the employer or another individual), the appearance of a survey, navigation parameters associated with the survey, use restrictions, automatic response features, and advanced features. Additionally, using the "Behavior" tab, the user can specify an e-mail address to which notifications of survey responses are sent.

Figure 19:

The screen shown in FIG. 19 allows an employer to change the appearance of a survey, including colors and fonts, whether to display a customized confirmation page (specified as a URL), whether to display an optional "Clear All Responses" button in a survey, and a message to be displayed when required information has not been provided by a respondent.

Figure 20:

The screen shown in FIG. 20 allows an employer to specify navigation properties associated with a survey, such as whether the survey can be navigated in multi-page format, and whether the respondent can navigate between pages using a "Go Back" button. Also, the employer can choose whether a progress "bar" is displayed to the respondent as the respondent completes the survey (displaying percentage of pages completed).

Figure 21:

The screen shown in FIG. 21 allows an employer to create a standard e-mail confirmation message to be sent to a respondent upon completion of a survey. This screen allows the employer to specify various e-mail addresses to which the confirmation message is to be sent, as well as the text of the confirmation message.

Figure 22:

The screen shown in FIG. 22 allows an employer to specify advanced settings associated with a survey, including whether the survey is to be securely transmitted to a respondent using a secured Internet connection, such as the Secure Sockets Layer (SSL) protocol. Also, the employer can disable usage of the Enter key to deter unintentional submissions of responses.

FIGS. 23A-23B are screenshots showing a sample questionnaire (survey) generated by the present invention, in connection with a job description. The questionnaire can be displayed and filled out by a potential employee (e.g., the potential employees 30a-30c of FIG. 1) using a standard web browser or a "fat" software client executing on a local computing system. As can be seen, the questionnaire asks the potential employee to provide contact information and a self-assessment of the potential employee's skills. The questions provided in the questionnaire are specified by the employer using the screens discussed above.

FIGS. 24-28 are screenshots showing user interface screens generated by the server 10 of the present invention for allowing an employer (e.g., the employers 20a-20b of FIG. 1) to conduct surveys, and to collect, view, and analyze survey results.

Figure 24:
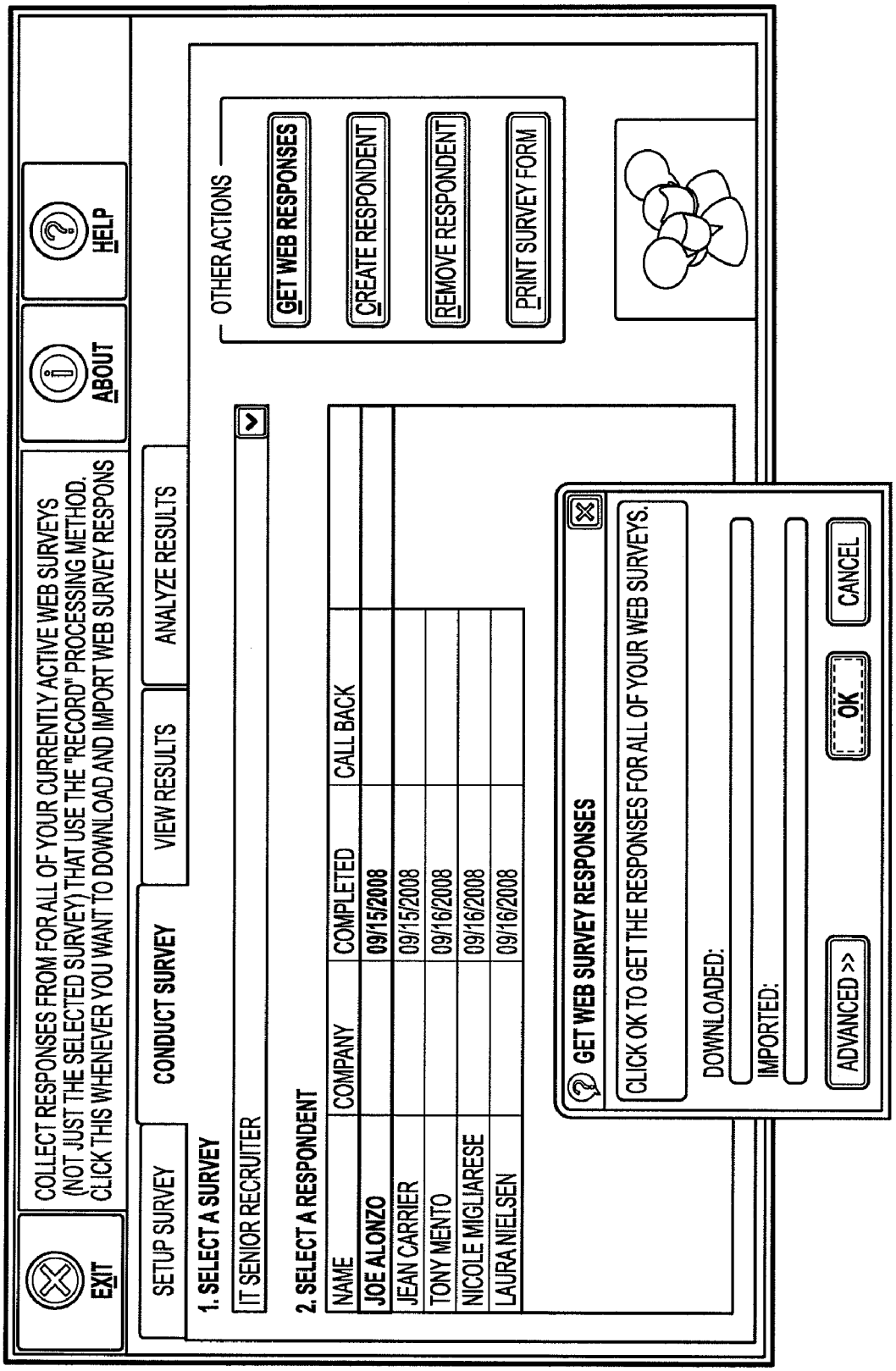

The screen shown in FIG. 24 allows an employer to specify desired respondents (by clicking on respondent names) for which surveys are to be conducted, and to retrieve survey results from such respondents. As can be seen, a pop-up screen displays the progress of downloaded and/or imported survey results, using "thermometer" progress indicators. Optionally, survey forms can be printed by clicking on the "Print Survey Form" button, and respondents can be created or removed by clicking the respective buttons.

Figure 25:
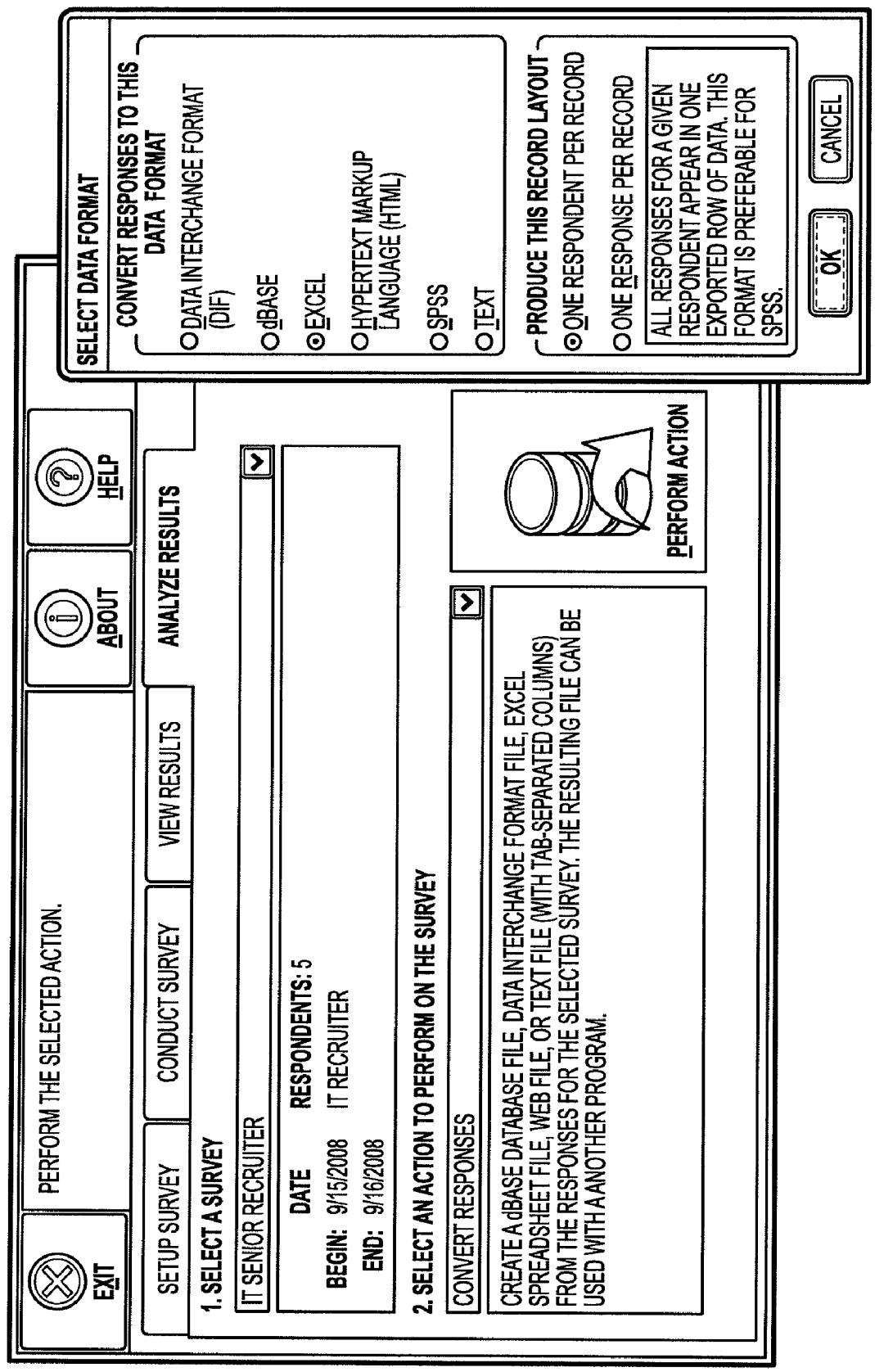

The screen shown in FIG. 25 allows an employer to analyze survey results by selecting a desired survey, and to perform a desired action in connection with the survey, such as converting the survey responses into desired file formats for analysis using third-party software packages, such as database/spreadsheet software packages (e.g., dBase, Excel), statistical analysis software packages (e.g., SPSS), and other programs using proprietary and/or non-proprietary data formats (e.g., data interchange format (DIF), hypertext markup language (HTML), or plain text).

Figure 26:
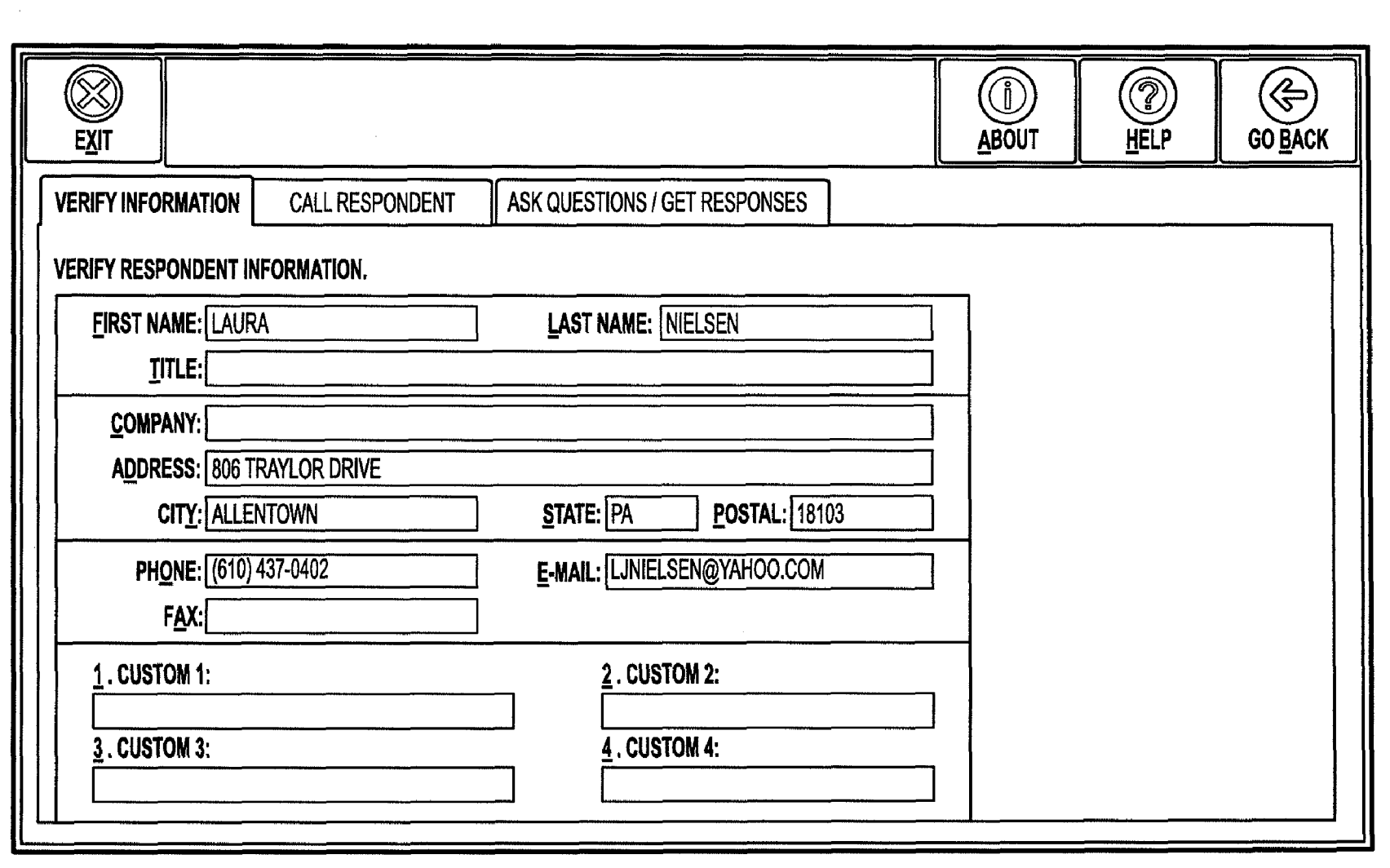
Figure 27:
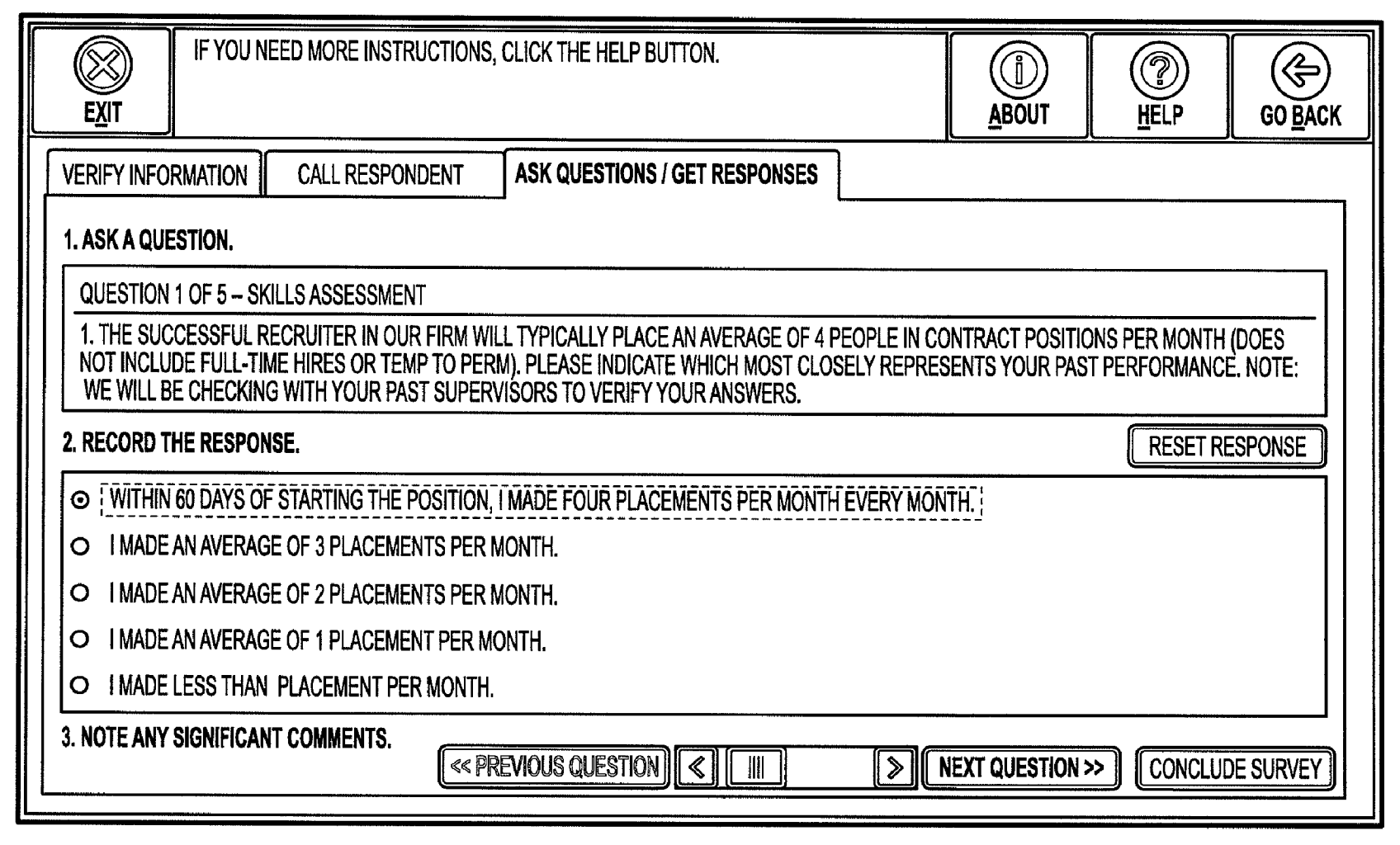

The screens shown in FIGS. 26-27 allows an employer to verify contact information for a respondent (including information for calling the respondent, by way of the "Call Respondent" tab), and to ask questions or retrieve responses for specific respondents. As shown in FIG. 26, contact information can be verified by viewing/editing contact information in the appropriate fields. As shown in FIG. 27, specific questions can be selected (to be posed to the respondent), as well as to retrieve responses to the questions.

Figure 28:
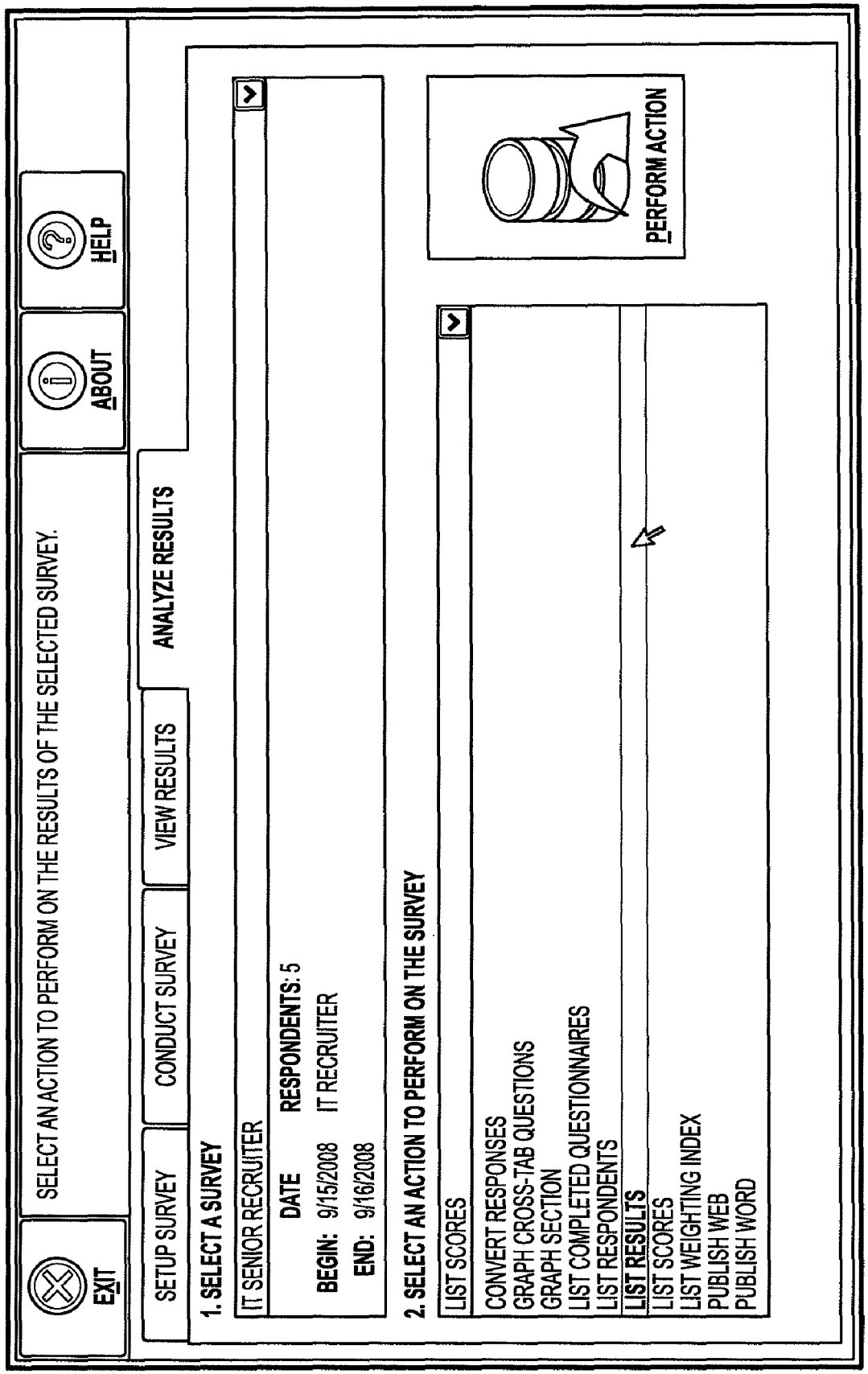

The screen shown in FIG. 28 allows an employer to perform a variety of actions in connection with analyzing responses to surveys. In addition to converting responses for analysis using third-party software packages (as discussed above), the present invention also allows an employer to graph cross-tab questions, graph sections of responses, list completed questionnaires, list results of analysis, list scores, list weighting indices, and to publish analysis results (in multiple formats, such as via the worldwide web, or in Microsoft Word format).

Figure 29:
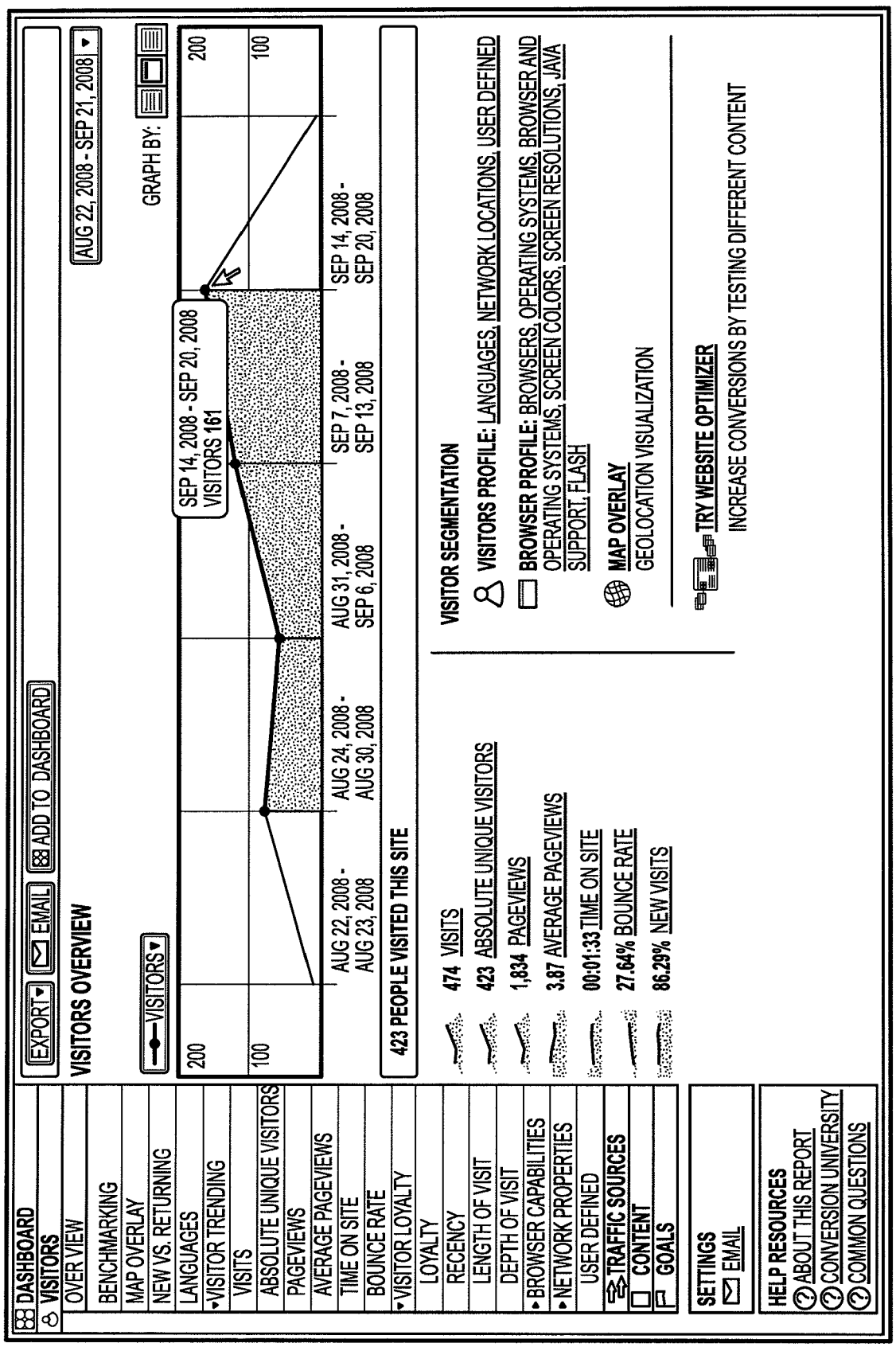
FIGS. 29-31 are screenshots showing user interface screens generated by the present invention for allowing a user to view/analyze demographics associated with potential employees.
Figure 30:
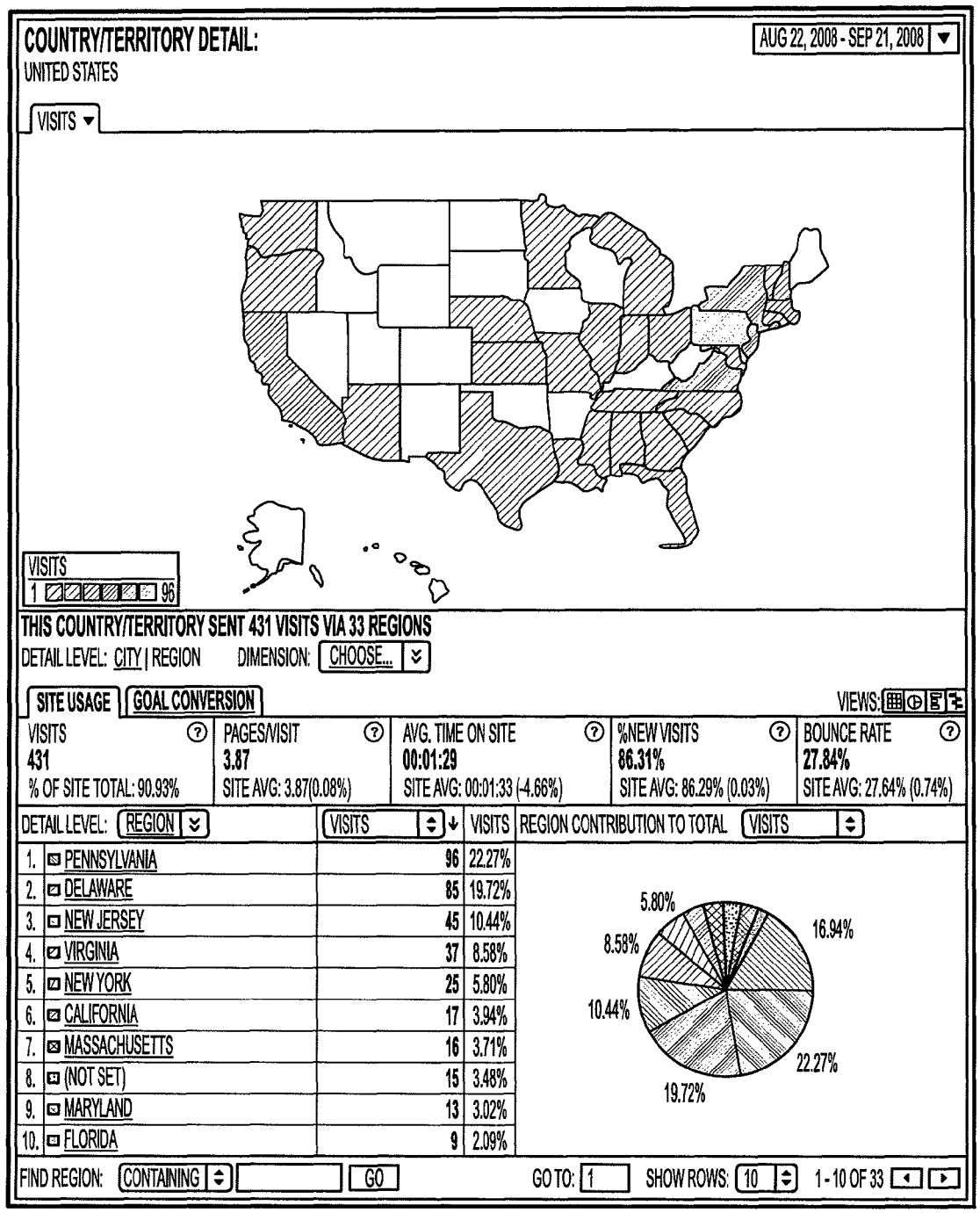
Figure 31:
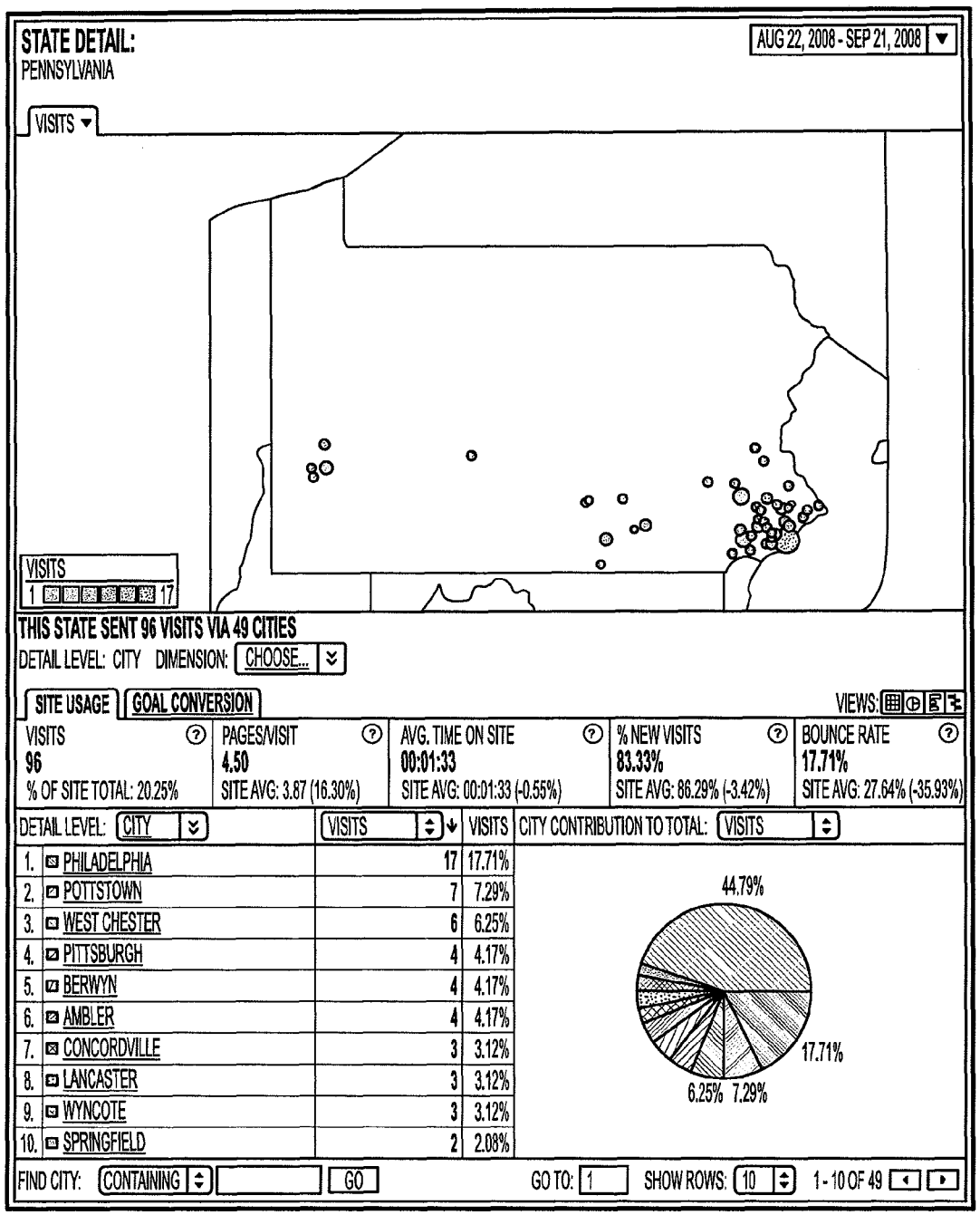

FIGS. 29-31 are screenshots showing user interface screens generated by the present invention, for allowing a user to view/analyze demographics associated with potential employees, The screen shown in FIG. 29 provides an overview of the number of potential employees who have visited the server 10, as well as actions taken by potential employees (e.g., page views, time spent on website, bounce rate, etc.). The screen shown in FIG. 30 provides a map showing the geographic locations of potential employees utilizing the present invention. The screen shown in FIG. 31 displays specific geographic locations within a desired state of potential employees utilizing the present invention.

It is noted that the user interface screens of the present invention discussed above in connection with FIGS. 8A-31 could be generated using any suitable programming language. Examples of such languages include, but are not limited to, HTML, C, C++, C#, Visual Basic, Java, Javascript, VBScript, PHP, Tcl/Tk, etc. Additionally, the screens of FIGS. 8A-31 could be generated using a conventional web browser in communication with the server 10 of FIG. 1, or they could be generated using a "fat" software client which executes on a user's local personal computing device and which communicates with the server 10 using any suitable communications protocol, such as TCP/IP and its associated utilities suites (e.g., file transfer protocol (FTP), sockets, etc.).

Figure 32:
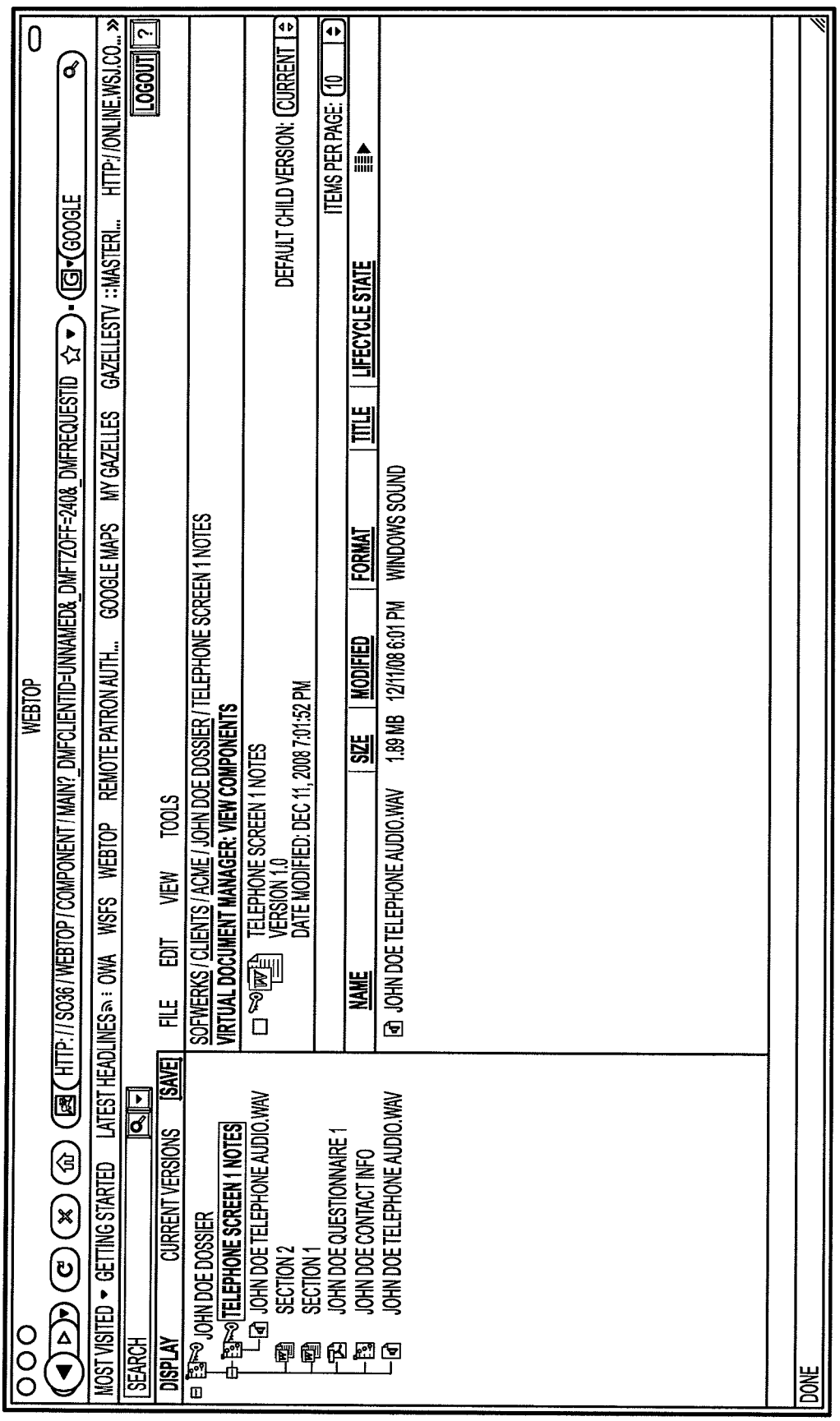
FIG. 32 is a screenshot showing a sample virtual dossier generated by the present invention.

FIG. 32 is a screenshot showing a sample virtual dossier generated by the present invention. The virtual dossier can be displayed and accessed using a conventional web browser. The virtual dossier provides a rich collection of information relating to the interview process for a potential employee (as discussed above), as well as information about the potential employee. As can be seen, a navigation panel is provided on the left side of the screen for allowing an interviewer or employer to access and review desired portions of the virtual dossier, including interview notes, contact information, questionnaires, responses to questionnaires, and video and/or audio recordings (e.g., in .WAV file format, or any other suitable format) of interviews. Once selected (by clicking on the desired item in the panel), detailed information is displayed in the upper and lower panels adjacent to the navigation panel, as shown in FIG. 32.

As mentioned above, the present invention allows for defining scoring values for each survey (questionnaire) response, as well as for each user-defined selection criteria. The corresponding values, based on a respondent's responses or an evaluator's analysis of collected questionnaires, notes, audio recordings, video recordings, live interviews (in person or remote), etc., are collected into the RDBMS of the present invention, or in other retrievable format (e.g., XML). Such scoring values (data) can then be used to perform analysis of the respondents (individually and/or as a group), to determine acceptability of some or all of the respondents for further consideration. This information can also be used to assist a hiring manager in making a final hiring decision for a pool of candidates. This scoring information can be presented using pre-defined selection process templates (displayed in a web browser or using a fat client application executing locally on the user's computing system), or user-defined custom processes, which may be saved by the user for future use. The data can also be exported to COTS (commercial off the shelf) software packages, such as spreadsheets, local databases, statistical analysis, etc., for further analysis.

Having thus described the invention in detail, it is to be understood that the foregoing description is not intended to limit the spirit or scope thereof. What is desired to be protected is set forth in the following claims.

What is claimed is:

1. A system for online recruiting and evaluation of potential employees, comprising:
    a first computer system operated by an employer;
    a second computer system operated by a potential employee;
    a central server in communication with the first computer system and the second computer system; and
    a network interconnecting the first computer system, the second computer system, and the central server,
    wherein a first set of user interface screens is generated at the first computer system for allowing the employer to create a job description corresponding to a job and at least one questionnaire associated with the job description, the employer creates the job description and the at least one questionnaire using the first set of user interface screens, and the employer transmits the job description and the at least one questionnaire to the central server for storage at the central server and searching by the potential employee,
    wherein the potential employee responds to the at least one questionnaire using a second set of user interface screens generated at the second computer system, and the potential employee's responses to the questionnaire are transmitted to the central server for storage at the central server, and
    wherein the central server requests the potential employee to consent to an interview of at least one prior employer of the potential employee and to identify the at least one prior employer, the central server processes the potential employee's responses to the at least one questionnaire create a virtual dossier for the potential employee accessible by the employer for allowing the employer to evaluate the potential employee if the potential employee communicates consent to the interview, and the central server informs the potential employee that consent to the interview is required by the employer if the potential employee does not communicate consent to the interview.

2. The system of claim 1, further comprising an Internet-accessible job search system in communication with the central server for allowing the potential employee to search for the job description.

3. The system of claim 2, wherein the central server transmits to the Internet-accessible job search system the job description and a hypertext link to the central server, the potential employee clicking the hypertext link to access the central server after the potential employee reviews the job description.

4. The system of claim 1, wherein the job description is posted in a printed publication for searching by the potential employee, and the potential employee accesses the central server to respond to the at least one questionnaire.

5. The system of claim 1, further comprising means for recording a telephone interview of the potential employee.

6. The system of claim 5, wherein a telephone interview of the potential employee is conducted by an interviewer and recorded by the means for recording.

7. The system of claim 6, wherein the central server stores a recorded telephone interview and includes the recorded telephone interview as part of the virtual dossier, for subsequent review by the employer.

8. The system of claim 5, further comprising a third set of user interface screens generated by the central server and accessible by an interviewer for allowing the interviewer to record interview notes.

9. The system of claim 8, wherein the central server stores the interview notes and includes the interview notes part of the virtual dossier, for subsequent review by the employer.

10. The system of claim 9, wherein the third set of user interface screens allows the interviewer to score or weight the potential employee's responses during the interview.

11. The system of claim 7, further comprising voice stress analysis software applied to the recorded interview for generating an analysis of the potential employee's stress level during the telephone interview.

12. The system of claim 11, wherein the analysis is stored by the central server and included as part of the virtual dossier.

13. The system of claim 1, further comprising means for recording a telephone interview of the at least one prior employer of the potential employee.

14. The system of claim 13, wherein a telephone interview of the at least one prior employer is conducted by an interviewer and recorded by the means for recording.

15. The system of claim 14, wherein the central server stores a recorded telephone interview and includes the recorded telephone interview as part of the virtual dossier, for subsequent review by the employer.

16. The system of claim 13, further comprising a third set of user interface screens generated by the central server and accessible by an interviewer for allowing the interviewer to record interview notes.

17. The system of claim 16, wherein the central server stores the interview notes and includes the interview notes part of the virtual dossier, for subsequent review by the employer.

18. The system of claim 15, further comprising voice stress analysis software applied to the recorded interview for generating an analysis of the potential employee's stress level during the telephone interview.

19. The system of claim 18, wherein the analysis is stored by the central server and included as part of the virtual dossier.

20. The system of claim 1, further comprising means for scoring responses by the candidate which are stored in the virtual dossier.

21. The system of claim 1, further comprising a third set of user interface screens generated by the central server and transmitted to the potential employee for allowing the potential employee to provide additional information about the at least one prior employer.

22. The system of claim 21, wherein the third set of user interface screens allows the potential employee to estimate the at least one prior employer's evaluation of the potential employee's past job performance.

23. The system of claim 22, wherein the central server stores the additional information and estimates generated by the potential employee and includes the additional information and estimates as part of the virtual dossier.

24. The system of claim 23, wherein the at least one prior employer can access and review the estimates.

25. The system of claim 1, wherein the employer reviews the virtual dossier to determine whether the potential employee should be invited to a personal interview.

26. The system of claim 25, further comprising means for recording the personal interview of the potential employee.

27. The system of claim 26, wherein the central server stores a recorded personal interview and includes the recorded personal interview as part of the virtual dossier, for subsequent review by the employer.

28. The system of claim 25, further comprising a third set of user interface screens generated by the central server and accessible by an interviewer for allowing the interviewer to record interview notes.

29. The system of claim 28, wherein the central server stores the interview notes and includes the interview notes part of the virtual dossier, for subsequent review by the employer.

30. The system of claim 29, wherein the third set of user interface screens allows the interviewer to score or weight the potential employee's responses during the interview.

31. The system of claim 27, further comprising voice stress analysis software applied to the recorded interview for generating an analysis of the potential employee's stress level during the telephone interview.

32. The system of claim 31, wherein the analysis is stored by the central server and included as part of the virtual dossier.

33. The system of claim 1, wherein the virtual dossier is made part of the potential employee's personnel file if the potential employee is hired by the employer.

34. A method for online recruitment and evaluation of potential employees, comprising the steps of:
provided a central server in communication with a first computer system operated by an employer and a second computer system operated by a potential employee;
generating a first set of user interface screens at the first computer system for allowing the employer to create a job description corresponding to a job and at least one questionnaire associated with the job description;
allowing the employer to create the job description and the at least one questionnaire at the first computer system using the first set of user interface screens;
transmitting the job description and the at least one questionnaire to the central server for storage at the central server and searching by the potential employee,
generating a second set of user interface screens for allowing the potential employee to respond to the at least one questionnaire;
allowing the potential employee to respond to the at least one questionnaire using the second set of user interface screens;
transmitting the potential employee's responses to the questionnaire to the central server for storage at the central server;
transmitting a request from the central server to the potential employee requesting the potential employee to consent to an interview of at least one prior employer of the potential employee and to identify the at least one prior employer;
processing the potential employee's responses at the central server;
if the potential employee communicates consent to the interview, creating a virtual dossier for the potential employee and allowing the employer to access the virtual dossier so that the employer can evaluate the potential employee and;
if the potential employee does not communicate consent to the interview, informing the potential employee that consent to the interview is required by the employer.

35. The method of claim 34, further comprising transmitting to an Internet-accessible job search system the job description and a hypertext link to the central server, the potential employee clicking the hypertext link to access the central server after the potential employee reviews the job description.

36. The method of claim 34, further comprising posting the job description in a printed publication for searching by the potential employee.

37. The method of claim 34, further comprising recording a telephone interview of the potential employee.

38. The method of claim 37, further comprising storing at the central server a recorded telephone interview and including the recorded telephone interview as part of the virtual dossier, for subsequent review by the employer.

39. The method of claim 37, further comprising generating a third set of user interface screens for allowing an interviewer to record interview notes.

40. The method of claim 39, further comprising storing the interview notes at the central server and including the interview notes as part of the virtual dossier, for subsequent review by the employer.

41. The method of claim 39, further comprising allowing the interviewer to score or weight the potential employee's responses during the interview using the third set of user interface screens.

42. The method of claim 38, further comprising applying voice stress analysis software to the recorded interview to generate an analysis of the potential employee's stress level during the telephone interview.

43. The method of claim 42, further comprising storing the analysis at the central server and including the analysis as part of the virtual dossier.

44. The method of claim 34, further comprising recording a telephone interview of the at least one prior employer of the potential employee.

45. The method of claim 44, further comprising storing at the central server a recorded telephone interview and including the recorded telephone interview as part of the virtual dossier, for subsequent review by the employer.

46. The method of claim 44, further comprising generating a third set of user interface screens for allowing an interviewer to record interview notes.

47. The method of claim 46, further comprising storing the interview notes at the central server and including the interview notes as part of the virtual dossier, for subsequent review by the employer.

48. The method of claim 45, further comprising applying voice stress analysis software to the recorded interview to generate an analysis of the at least one prior employer's stress level during the telephone interview.

49. The method of claim 48, further comprising storing the analysis at the central server and including the analysis as part of the virtual dossier.

50. The method of claim 34, further comprising scoring responses by the candidate which are stored in the virtual dossier.

51. The method of claim 34, further comprising generating a third set of user interface screens for allowing the potential employee to provide additional information about the at least one prior employer.

52. The method of claim 51, further comprising allowing the potential employee to estimate the at least one prior employer's evaluation of the potential employee's past job performance using the third set of user interface screens.

53. The method of claim 52, further comprising storing at the central server the additional information and estimates generated by the potential employee and including the additional information and estimates as part of the virtual dossier.

54. The method of claim 53, further comprising allowing the at least one prior employer to access and review the estimates.

55. The method of claim 34, further comprising allowing the employer to review the virtual dossier to determine whether the potential employee should be invited to a personal interview.

56. The method of claim 55, further comprising recording the personal interview of the potential employee.

57. The method of claim 56, further comprising storing a recorded personal interview at the central server and including the recorded personal interview as part of the virtual dossier, for subsequent review by the employer.

58. The method of claim 56, further comprising generating a third set of user interface screens for allowing an interviewer to record interview notes.

59. The method of claim 58, further comprising storing the interview notes at the central server and including the interview notes as part of the virtual dossier, for subsequent review by the employer.

60. The method of claim 58, further comprising allowing the interviewer to score or weight the potential employee's responses during the interview using the third set of user interface screens.

61. The method of claim 57, further comprising applying voice stress analysis software to the recorded interview to generate an analysis of the potential employee's stress level during the telephone interview.

62. The method of claim 61, further comprising storing the analysis at the central server and including the analysis as part of the virtual dossier.

63. The method of claim 34, further comprising making the virtual dossier part of the potential employee's personnel file if the potential employee is hired by the employer.

* * * * *